(12) United States Patent
Tobin et al.

(10) Patent No.: US 9,753,935 B1
(45) Date of Patent: Sep. 5, 2017

(54) TIME-SERIES DATA STORAGE AND PROCESSING DATABASE SYSTEM

(71) Applicant: Palantir Technologies Inc., Palo Alto, CA (US)

(72) Inventors: David Tobin, Atherton, CA (US); Pawel Adamowicz, London (GB); Steven Fackler, Menlo Park, CA (US); Sri Krishna Vempati, Jersey City, NJ (US); Wilson Wong, Menlo Park, CA (US); Orcun Simsek, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/226,675

(22) Filed: Aug. 2, 2016

(51) Int. Cl.
*G06F 17/30* (2006.01)

(52) U.S. Cl.
CPC .. *G06F 17/30138* (2013.01); *G06F 17/30554* (2013.01)

(58) Field of Classification Search
None
See application file for complete search history.

(56) References Cited

U.S. PATENT DOCUMENTS

| | | | |
|---|---|---|---|
| 5,724,575 A | 3/1998 | Hoover et al. | |
| 5,872,973 A | 2/1999 | Mitchell et al. | |
| 5,897,636 A | 4/1999 | Kaeser | |
| 6,073,129 A | 6/2000 | Levine et al. | |
| 6,094,653 A | 7/2000 | Li et al. | |
| 6,161,098 A | 12/2000 | Wallman | |
| 6,243,717 B1 | 6/2001 | Gordon et al. | |
| 6,304,873 B1 | 10/2001 | Klein et al. | |

(Continued)

FOREIGN PATENT DOCUMENTS

| | | |
|---|---|---|
| AU | 2014206155 | 12/2015 |
| EP | 0652513 | 5/1995 |

(Continued)

OTHER PUBLICATIONS

"Apache HBase", http://hbase.apache.org/ printed Sep. 14, 2011 in 1 page.

(Continued)

*Primary Examiner* — Sangwoo Ahn
(74) *Attorney, Agent, or Firm* — Knobbe Martens Olson & Bear LLP

(57) ABSTRACT

A database system is described that includes components for storing time-series data and executing custom, user-defined computational expressions in substantially real-time such that the results can be provided to a user device for display in an interactive user interface. For example, the database system may process stored time-series data in response to requests from a user device. The request may include a start time, an end time, a period, and/or a computational expression. The database system may retrieve the time-series data identified by the computational expression and, for each period, perform the arithmetic operation(s) identified by the computational expression on data values corresponding to times within the start time and the end time. Once all new data values have been generated, the database system may transmit the new data values to the user device for display in the interactive user interface.

15 Claims, 20 Drawing Sheets

(56) References Cited

U.S. PATENT DOCUMENTS

| | | |
|---|---|---|
| 6,366,933 B1 | 4/2002 | Ball et al. |
| 6,418,438 B1 | 7/2002 | Campbell |
| 6,510,504 B2 | 1/2003 | Satyanarayanan |
| 6,549,752 B2 | 4/2003 | Tsukamoto |
| 6,560,620 B1 | 5/2003 | Ching |
| 6,574,635 B2 | 6/2003 | Stauber et al. |
| 6,609,085 B1* | 8/2003 | Uemura ............... G05B 19/418 702/113 |
| 6,745,382 B1 | 6/2004 | Zothner |
| 6,976,210 B1 | 12/2005 | Silva et al. |
| 6,980,984 B1 | 12/2005 | Huffman et al. |
| 7,058,648 B1 | 6/2006 | Lightfoot et al. |
| 7,111,231 B1 | 9/2006 | Huck et al. |
| 7,194,680 B1 | 3/2007 | Roy et al. |
| 7,461,158 B2 | 12/2008 | Rider et al. |
| 7,725,530 B2 | 5/2010 | Sah et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,761,407 B1 | 7/2010 | Stern |
| 7,814,084 B2 | 10/2010 | Hallett et al. |
| 7,962,495 B2 | 6/2011 | Jain et al. |
| 7,984,374 B2 | 7/2011 | Caro et al. |
| 8,041,714 B2 | 10/2011 | Aymeloglu et al. |
| 8,112,425 B2 | 2/2012 | Baum et al. |
| 8,126,848 B2 | 2/2012 | Wagner |
| 8,185,819 B2 | 5/2012 | Sah et al. |
| 8,504,542 B2 | 8/2013 | Chang et al. |
| 8,676,857 B1 | 3/2014 | Adams et al. |
| 8,930,331 B2 | 1/2015 | McGrew et al. |
| 8,954,410 B2 | 2/2015 | Chang et al. |
| 9,009,827 B1 | 4/2015 | Albertson et al. |
| 9,043,696 B1 | 5/2015 | Meiklejohn et al. |
| 9,092,482 B2 | 7/2015 | Harris et al. |
| 9,116,975 B2 | 8/2015 | Shankar et al. |
| 9,195,700 B1* | 11/2015 | Becker ............. G06F 17/30336 |
| 9,208,159 B2 | 12/2015 | Stowe et al. |
| 9,230,280 B1 | 1/2016 | Maag et al. |
| 9,280,532 B2 | 3/2016 | Cicerone |
| 2001/0051949 A1 | 12/2001 | Carey et al. |
| 2001/0056522 A1 | 12/2001 | Satyanarayana |
| 2002/0091694 A1 | 7/2002 | Hrle et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0130993 A1 | 7/2003 | Mendelevitch et al. |
| 2003/0212718 A1 | 11/2003 | Tester |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0148301 A1 | 7/2004 | McKay et al. |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0131990 A1* | 6/2005 | Jewell ............. G06F 11/1464 709/201 |
| 2005/0289524 A1 | 12/2005 | McGinnes |
| 2006/0074881 A1 | 4/2006 | Vembu et al. |
| 2006/0080316 A1 | 4/2006 | Gilmore et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0161558 A1 | 7/2006 | Tamma et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2007/0050429 A1 | 3/2007 | Goldring et al. |
| 2007/0061487 A1 | 3/2007 | Moore et al. |
| 2007/0143253 A1 | 6/2007 | Kostamaa et al. |
| 2007/0185850 A1 | 8/2007 | Walters et al. |
| 2007/0233756 A1 | 10/2007 | D'Souza et al. |
| 2007/0271317 A1 | 11/2007 | Carmel |
| 2008/0015970 A1 | 1/2008 | Brookfield et al. |
| 2008/0104060 A1 | 5/2008 | Abhyankar et al. |
| 2008/0104149 A1 | 5/2008 | Vishniac et al. |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0270316 A1 | 10/2008 | Guidotti et al. |
| 2008/0301378 A1 | 12/2008 | Carrie |
| 2009/0031247 A1 | 1/2009 | Walter et al. |
| 2009/0106308 A1 | 4/2009 | Killian et al. |
| 2009/0164387 A1 | 6/2009 | Armstrong et al. |
| 2009/0177962 A1 | 7/2009 | Gusmorino et al. |
| 2009/0254971 A1 | 10/2009 | Herz |
| 2009/0271435 A1 | 10/2009 | Yako et al. |
| 2009/0313223 A1 | 12/2009 | Rantanen |
| 2009/0313311 A1 | 12/2009 | Hoffmann et al. |
| 2010/0036831 A1 | 2/2010 | Vemuri et al. |
| 2010/0070489 A1 | 3/2010 | Aymeloglu et al. |
| 2010/0076939 A1 | 3/2010 | Iwaki et al. |
| 2010/0082541 A1 | 4/2010 | Kottomtharayil |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0191884 A1 | 7/2010 | Holenstein et al. |
| 2010/0211550 A1 | 8/2010 | Daniello et al. |
| 2010/0211618 A1 | 8/2010 | Anderson et al. |
| 2010/0235606 A1 | 9/2010 | Oreland et al. |
| 2010/0283787 A1 | 11/2010 | Hamedi et al. |
| 2010/0325581 A1 | 12/2010 | Finkelstein et al. |
| 2011/0029498 A1 | 2/2011 | Ferguson et al. |
| 2011/0047540 A1 | 2/2011 | Williams et al. |
| 2011/0153592 A1 | 6/2011 | DeMarcken |
| 2011/0173619 A1 | 7/2011 | Fish |
| 2011/0184813 A1 | 7/2011 | Barnes et al. |
| 2011/0218978 A1 | 9/2011 | Hong et al. |
| 2011/0258158 A1 | 10/2011 | Resende et al. |
| 2011/0258242 A1 | 10/2011 | Eidson et al. |
| 2011/0270812 A1 | 11/2011 | Ruby |
| 2012/0072825 A1 | 3/2012 | Sherkin et al. |
| 2012/0123989 A1 | 5/2012 | Yu et al. |
| 2012/0124179 A1 | 5/2012 | Cappio et al. |
| 2012/0150791 A1 | 6/2012 | Willson |
| 2012/0150925 A1* | 6/2012 | Gupta .................. G06F 3/0605 707/822 |
| 2012/0159307 A1 | 6/2012 | Chung et al. |
| 2012/0330908 A1 | 12/2012 | Stowe et al. |
| 2012/0330931 A1* | 12/2012 | Nakano ............. G05B 23/0283 707/722 |
| 2013/0036346 A1 | 2/2013 | Cicerone |
| 2013/0060742 A1 | 3/2013 | Chang et al. |
| 2013/0066882 A1* | 3/2013 | Westbrooke ...... G06F 17/30312 707/746 |
| 2013/0097130 A1 | 4/2013 | Bingol et al. |
| 2013/0151388 A1 | 6/2013 | Falkenborg et al. |
| 2013/0304770 A1 | 11/2013 | Boero et al. |
| 2013/0318060 A1 | 11/2013 | Chang et al. |
| 2014/0040276 A1* | 2/2014 | Chen ................. G06F 17/30339 707/746 |
| 2014/0095543 A1 | 4/2014 | Hsiao et al. |
| 2014/0149272 A1 | 5/2014 | Hirani et al. |
| 2014/0181833 A1 | 6/2014 | Bird et al. |
| 2014/0324876 A1 | 10/2014 | Konik et al. |
| 2014/0344231 A1 | 11/2014 | Stowe et al. |
| 2015/0039886 A1 | 2/2015 | Kahol et al. |
| 2015/0089353 A1 | 3/2015 | Folkening |
| 2015/0106347 A1 | 4/2015 | McGrew et al. |
| 2015/0112956 A1 | 4/2015 | Chang et al. |
| 2015/0186434 A1* | 7/2015 | Eichinger ......... G06F 17/30551 707/693 |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |

(56) References Cited

U.S. PATENT DOCUMENTS

| | | | |
|---|---|---|---|
| 2015/0278325 | A1 | 10/2015 | Masuda et al. |
| 2015/0341467 | A1 | 11/2015 | Lim et al. |
| 2015/0379065 | A1* | 12/2015 | Yoshizawa ........ G06F 17/30309 707/689 |
| 2016/0034545 | A1 | 2/2016 | Shankar et al. |
| 2016/0062555 | A1 | 3/2016 | Ward et al. |
| 2016/0164912 | A1* | 6/2016 | Del Fante ........... H04L 63/1416 726/23 |
| 2016/0328432 | A1* | 11/2016 | Raghunathan .... G06F 17/30321 |

FOREIGN PATENT DOCUMENTS

| | | |
|---|---|---|
| EP | 2555126 | 2/2013 |
| EP | 2863326 | 4/2015 |
| EP | 2891992 | 7/2015 |
| EP | 2993595 | 3/2016 |
| WO | WO 2012/025915 | 3/2012 |

OTHER PUBLICATIONS

"The Apache Cassandra Project", http://cassandra.apache.org/ printed Sep. 14, 2011 in 3 pages.
Anonymous, "BackTult—JD Edwards One World Version Control System", Jul. 23, 2007, in 1 page.
Antoshenkov, Gennady, "Dictionary-Based Order-Preserving String Compression", The VLDB Journal, 1997, pp. 26-39.
Baker et al., "Megastore: Providing Scalable, Highly Available Storage for Interactive Services", 5th Biennial Conference on Innovative Data Systems Research (CIDR '11), Asilomar, California, Jan. 9-12, 2011.
Bernstein et al., "Hyder—A Transactional Record Manager for Shared Flash", 5th Biennial Conference on Innovative Data Systems Research (CIDR '11), vol. 12, Asilomar, California, Jan. 9-12, 2011.
Chang et al., "Bigtable: A Distributed Storage System for Structured Data", Google, Inc., OSDI'06: Seventh Symposium on Operating System Design and Implementation, Seattle, WA, Nov. 2006.
Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.
Devanbu et al., "Authentic Third-party Data Publication", http://www.cs.ucdavis.edu/~devanbu/authdbpub.pdf, p. 19, 2000.
Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.
Elmasri et al., "Fundamentals of Database Systems", Fourth Edition, pp. 455-491, 2004.
Hogue et al., "Thresher: Automating the Unwrapping of Semantic Content from the World Wide Web", 14th International Conference on World Wide Web, WWW 2005: Chiba, Japan, May 10-14, 2005.
Klemmer et al., "Where Do Web Sites Come From? Capturing and Interacting with Design History," Association for Computing Machinery, CHI 2002, Apr. 20-25, 2002, Minneapolis, MN, pp. 8.
Kokossi et al., "D7-Dynamic Ontology Management System (Design)", Information Societies Technology Programme, Jan. 10, 2002, pp. 1-27.
Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.
Miklau et al., "Securing History: Privacy and Accountability in Database Systems", 3rd Biennial Conference on Innovative Data Systems Research (CIDR), pp. 387-396, Asilomar, California, Jan. 7-10, 2007.
Niepert et al., "A Dynamic Ontology for a Dynamic Reference Work", Joint Conference on Digital Libraries, pp. 1-10, Vancouver, British Columbia, Jun. 17-22, 2007.
Nierman, "Evaluating Structural Similarity in XML Documents", 6 pages, 2002.
Peng et al., "Large-scale Incremental Processing Using Distributed Transactions and Notifications", Proceedings of the 9th USENIX Symposium on Operating Systems Design and Implementation, USENIX, p. 14, 2010.
Quest, "Toad for Oracle 11.6—Guide to Using Toad", pp. 1-162, Sep. 24, 2012.
Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.
Wikipedia, "Federated Database System," Sep. 7, 2013, retrieved from the internet on Jan. 27, 2015 http://en.wikipedia.org/w/index.php?title=Federated_database_system&oldid=571954221.
Wollrath et al., "A Distributed Object Model for the Java System", Conference on Object-Oriented Technologies and Systems, pp. 219-231, Jun. 17-21, 1996.
Yang et al., "HTML Page Analysis Based on Visual Cues", A129, pp. 859-864, 2001.
Notice of Allowance for U.S. Appl. No. 13/196,788 dated Dec. 18, 2015.
Notice of Allowance for U.S. Appl. No. 13/826,228 dated Mar. 27, 2015.
Notice of Allowance for U.S. Appl. No. 14/192,767 dated Dec. 16, 2014.
Notice of Allowance for U.S. Appl. No. 14/278,963 dated Sep. 2, 2015.
Notice of Allowance for U.S. Appl. No. 14/451,221 dated Aug. 4, 2015.
Notice of Allowance for U.S. Appl. No. 14/504,103 dated May 18, 2015.
Notice of Allowance for U.S. Appl. No. 14/734,772 dated Apr. 27, 2016.
Notice of Allowance for U.S. Appl. No. 14/746,671 dated Jan. 21, 2016.
Notice of Allowance for U.S. Appl. No. 15/171,494 dated Oct. 12, 2016.
Official Communication for European Patent Application No. 14189344.6 dated Feb. 20, 2015.
Official Communication for European Patent Application No. 14199182.8 dated Mar. 13, 2015.
Official Communication for European Patent Application No. 15183721.8 dated Nov. 23, 2015.
Official Communication for Netherlands Patent Application No. 2012436 dated Nov. 6, 2015.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 14/278,963 dated Jan. 30, 2015.
Official Communication for U.S. Appl. No. 14/451,221 Apr. 6, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/578,389 dated Oct. 21, 2015.
Official Communication for U.S. Appl. No. 14/578,389 dated Apr. 22, 2016.
Official Communication for U.S. Appl. No. 14/580,218 dated Jun. 26, 2015.
Official Communication for U.S. Appl. No. 14/726,211 dated Apr. 5, 2016.
Official Communication for U.S. Appl. No. 14/734,772 dated Jul. 24, 2015.
Official Communication for U.S. Appl. No. 14/734,772 dated Oct. 30, 2015.
Official Communication for U.S. Appl. No. 14/746,671 dated Nov. 12, 2015.

(56) References Cited

OTHER PUBLICATIONS

Official Communication for U.S. Appl. No. 14/746,671 dated Sep. 28, 2015.
Official Communication for U.S. Appl. No. 14/841,338 dated Feb. 18, 2016.
Official Communication for U.S. Appl. No. 14/996,179 dated May 20, 2016.

* cited by examiner

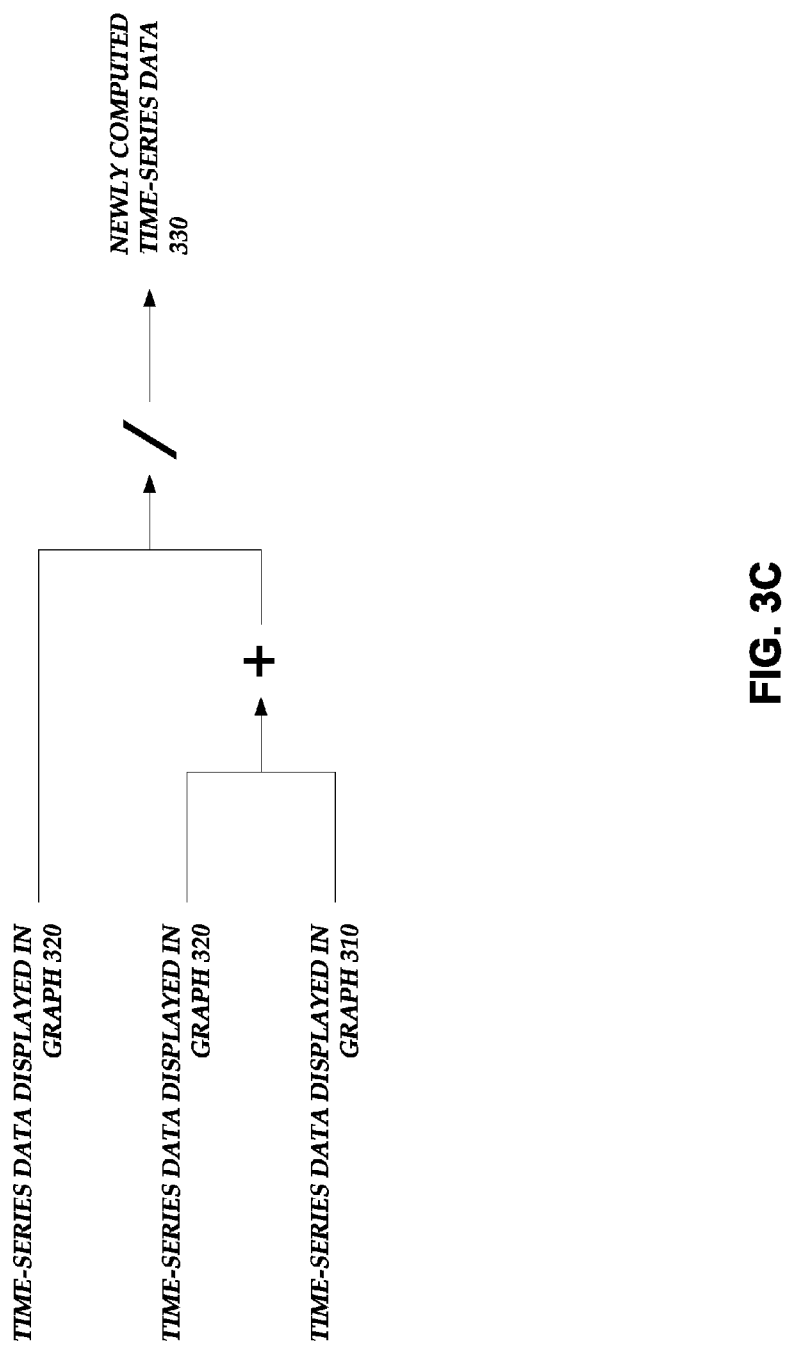

*Time, Value*

12:42:07, 100
12:42:08, 100
12:42:09, 100
12:42:10, 200
*RAW DATA*    12:42:11, 200
*450*    12:42:12, 100
12:42:13, 100
12:42:14, 200
12:42:15, 200
12:42:16, 200
12:42:17, 300
12:42:18, 300
12:42:19, 300
12:42:20, 400
12:42:21, 400
12:42:22, 400
12:42:23, 500
12:42:24, 500
12:42:25, 500
12:42:26, 100
12:42:27, 100
12:42:28, 100
12:42:29, 200
12:42:30, 200
12:42:31, 200
12:42:32, 300
12:42:33, 300
12:42:34, 300
12:42:35, 400
12:42:36, 400
12:42:37, 400
12:42:38, 500
12:42:39, 500
12:42:40, 500

FIG. 4C

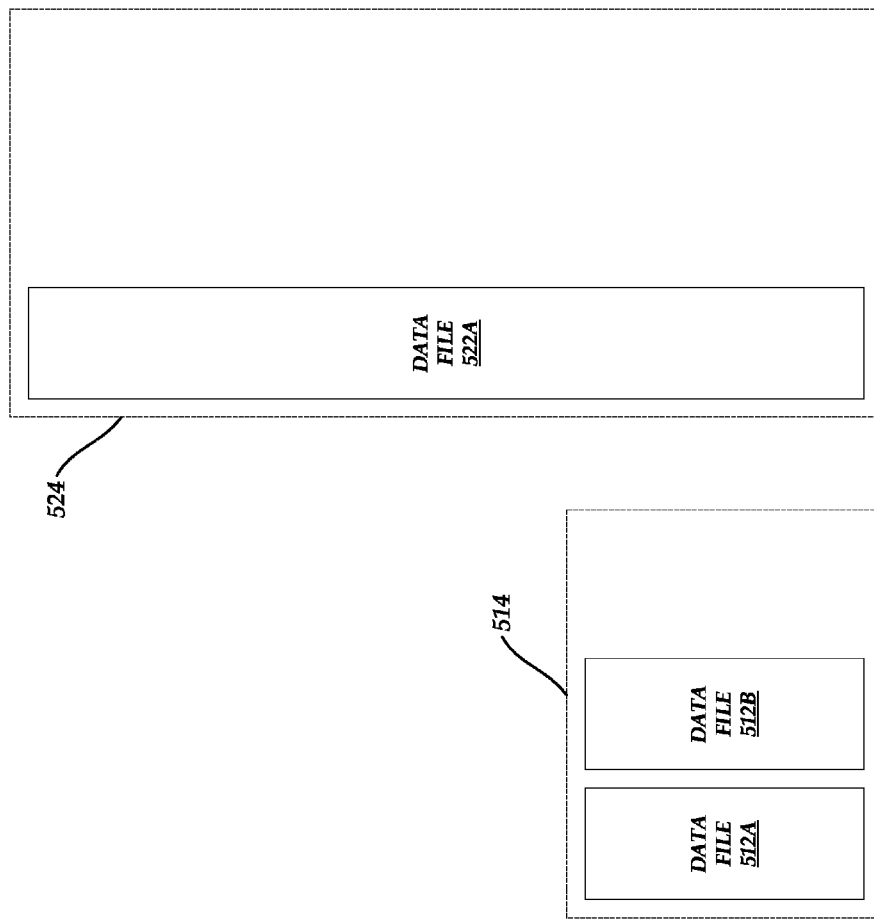

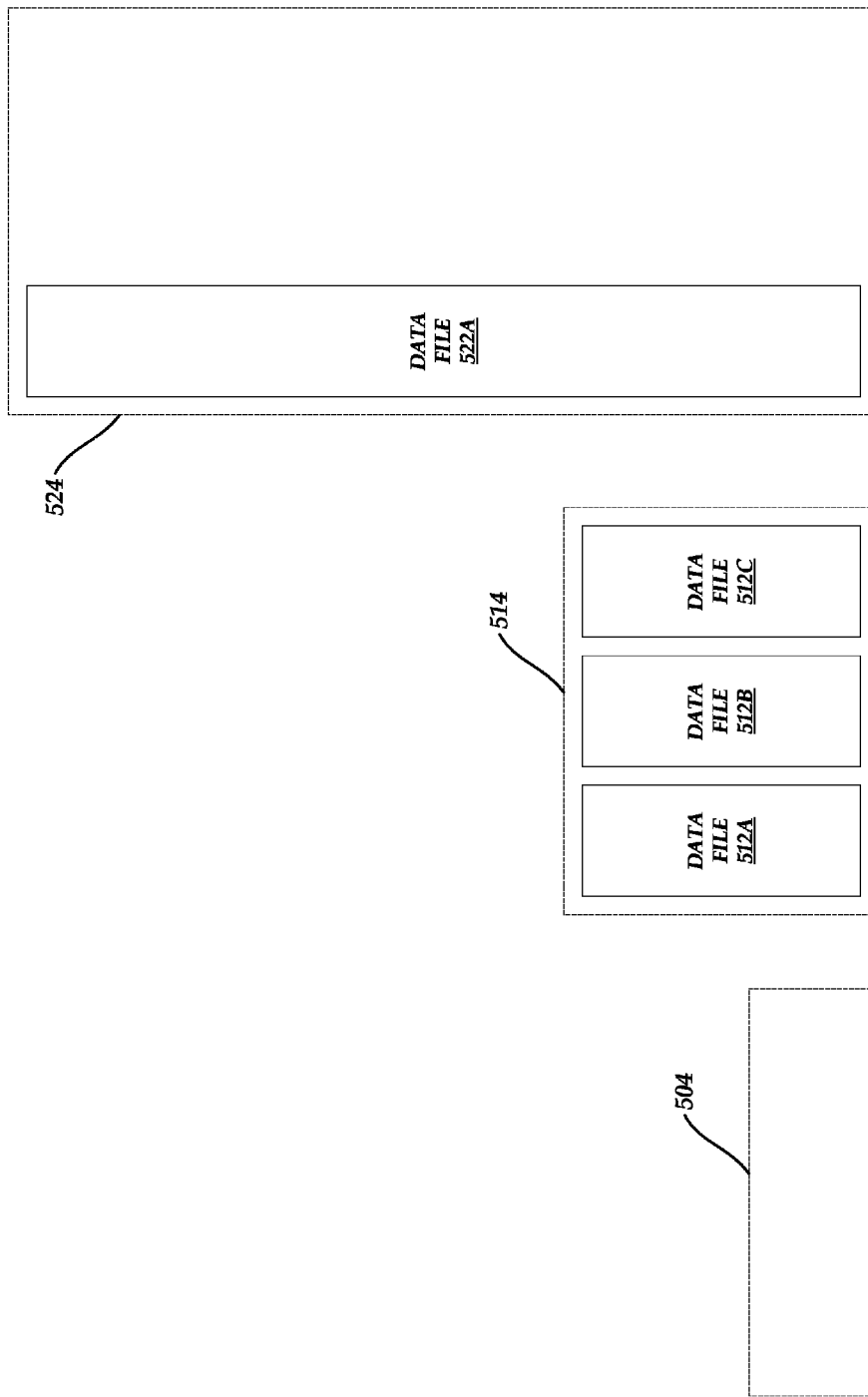

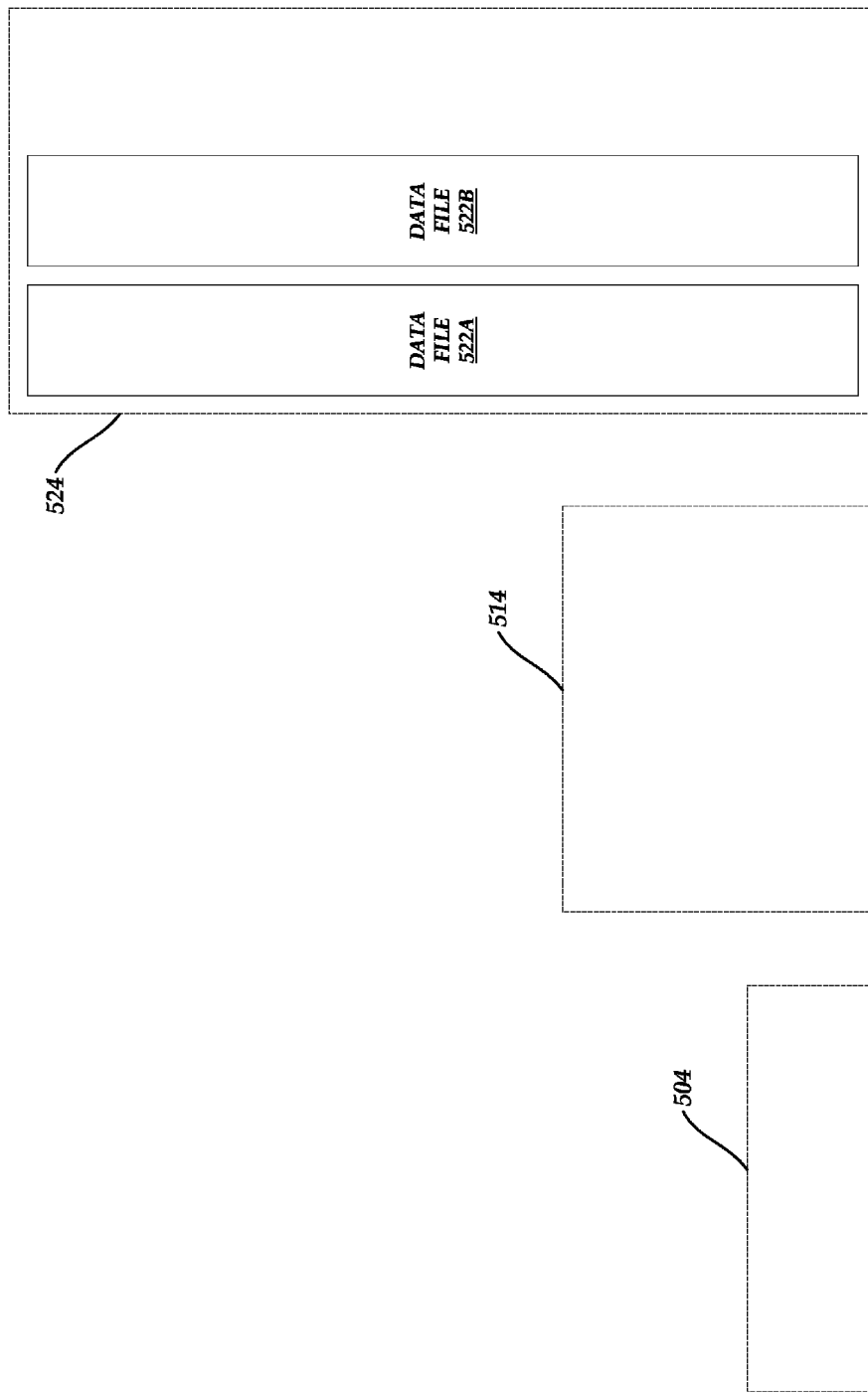

TIME-SERIES DATA STORAGE AND PROCESSING DATABASE SYSTEM

TECHNICAL FIELD

The present disclosure relates to database systems that store and process data for display in an interactive user interface.

BACKGROUND

A database may store a large quantity of data. For example, a system may comprise a large number of sensors that each collect measurements at regular intervals, and the measurements may be stored in the database. The measurement data can be supplemented with other data, such as information regarding events that occurred while the system was operational, and the supplemental data can also be stored in the database.

In some cases, a user may attempt to analyze a portion of the stored data. For example, the user may attempt to analyze a portion of the stored data that is associated with a specific time period. In response, the user's device may retrieve the appropriate data from the database. However, as the quantity of data stored in the database increases over time, retrieving the appropriate data from the database and performing the analysis can become complicated and time consuming. Thus, the user may experience noticeable delay in the display of the desired data.

SUMMARY

The systems, methods, and devices described herein each have several aspects, no single one of which is solely responsible for its desirable attributes. Without limiting the scope of this disclosure, several non-limiting features will now be discussed briefly.

Disclosed herein is a database system that includes components for storing time-series data and executing custom, user-defined computational expressions in substantially real-time such that the results can be provided to a user device for display in an interactive user interface. For example, the database system may include memory storage, disk storage, and/or one or more processors. Data received from a data source may include value and timestamp pairs and, once written to disk, may be immutable. Thus, the database system may not overwrite a portion of the data or append additional data to the written data once the data is written to disk. Because the data is immutable, all data written to disk can be memory mapped given that the location of the data will not change.

The database system may process stored time-series data in response to requests from a user device. For example, the user may request to view time-series data by manipulating an interactive user interface. The request, received by the database system from the user device (possibly via a server), may include a start time, an end time, a period, and/or a computational expression. The start time and end time may correspond with a range of timestamp values for which associated time-series data values should be retrieved. The period may indicate, when analyzed in conjunction with the start time and end time, a number of data points requested by the user device for display in the interactive user interface. The computational expression may indicate an arithmetic (and/or other type of) operation, if any, that the user wishes to perform on one or more sets of time-series data.

Example arithmetic operations include a sum, a difference, a product, a ratio, a zScore, a square root, and/or the like.

Once the database system receives the request, the database system may begin retrieving the appropriate time-series data and performing the indicated arithmetic (and/or other types of) operations via the one or more processors. Depending on the type of indicated operation(s) to be performed, the one or more processors may perform pointwise operations or sliding window operations. As described above, because the data files may be memory mapped, the one or more processors can access the data files from memory, rather than from disk, to perform the indicated operations. The database system described herein may then achieve better performance when generating the new data values as compared with conventional databases. Once all new data values have been generated, the database system may transmit the new data values to the user device (for example, via the server) for display in the interactive user interface.

One aspect of the disclosure provides a database configured to receive and process requests associated with time-series data and provide results to a user device. The database comprises a processing node comprising a computer processor and memory. The database further comprises a time-series database storing a first data segment file and a second data segment file, where the first data segment file comprises data associated with a first time-series, where a size of the first data segment file is within a first size range, where a size of the second data segment file is within the first size range. The database further comprises a computer readable storage medium storing program instructions, where the program instructions are configured for execution by the computer processor in order to cause the processing node to: determine that a number of data segment files stored in the time-series database that comprise data associated with the first time-series and that have a size within the first size range is greater than a threshold value; compact the first data segment file with the second data segment file to form a third data segment file, where a size of the third data segment file is within a second size range different than the first size range; and store the third data segment file in the time-series database.

The database of the preceding paragraph can include any sub-combination of the following features: where the program instructions are further configured for execution by the computer processor in order to cause the processing node to: determine that a number of data segment files stored in the time-series database that comprise data associated with the first time-series and that have a size within the second size range is greater than a second threshold value, compact the third data segment file with the other data segment files that comprise data associated with the first time-series and that have a size within the second size range to form a fourth data segment file, where a size of the fourth data segment file is within a third size range different than the first and second size ranges, and store the fourth data segment file in the time-series database; where the threshold value and the second threshold value are the same value; where the program instructions are further configured for execution by the computer processor in order to cause the processing node to mark the first data segment file and the second data segment file for deletion; where the program instructions are further configured for execution by the computer processor in order to cause the processing node to: receive second data associated with the first time-series, compress the second data, and store the compressed second data in the time-series database as the second data segment file; where the program instructions are further configured for execution by the computer processor in order to cause the processing node to compress the second data using one of block compression, out of box compression, or a delta-based compression; where the program instructions are further configured for execution by the computer processor in order to cause the processing node to store the compressed second data in a global write ahead log and in an in-memory buffer associated with the first time-series; where the program instructions are further configured for execution by the computer processor in order to cause the processing node to store the compressed second data in a local write ahead log associated with the first time-series in response to the global write ahead log reaching capacity; where the program instructions are further configured for execution by the computer processor in order to cause the processing node to store the compressed second data in the time-series database as the second data segment file in response to the local write ahead log reaching capacity; where a range of sizes corresponding to the second size range is larger than a range of sizes corresponding to the first size range; where the first size range is contiguous with the second size range; where the program instructions are further configured for execution by the computer processor in order to cause the processing node to: receive a series expression, a start time, an end time, and a period from a user device, retrieve, from the time-series database, a portion of the third data segment file corresponding to the start time and the end time, and transmit the portion of the third data segment file to a plug-in computation device for generating, for each period between the start time and the end time, a value based on a computation identified by the series expression; where the program instructions are further configured for execution by the computer processor in order to cause the processing node to: receive the generated values from the plug-in computation device, and transmit the generated values to the user device for display; where the start time and the end time correspond to a window of data displayed in an interactive user interface generated by the user device; where the period identifies a period of time that corresponds with a width of a pixel in the interactive user interface; and where the first data segment file stored in the time-series database is immutable.

BRIEF DESCRIPTION OF THE DRAWINGS

FIG. 3C illustrates an example nested set of arithmetic operations.

FIGS. 4A-4C illustrate an example file structure as stored in a node data store, such as a node data store of FIG. 1B.

FIGS. 5A-5D are block diagrams depicting several time-series data files grouped into buckets.

DETAILED DESCRIPTION OF SPECIFIC EMBODIMENTS

Overview

Figure 1A:
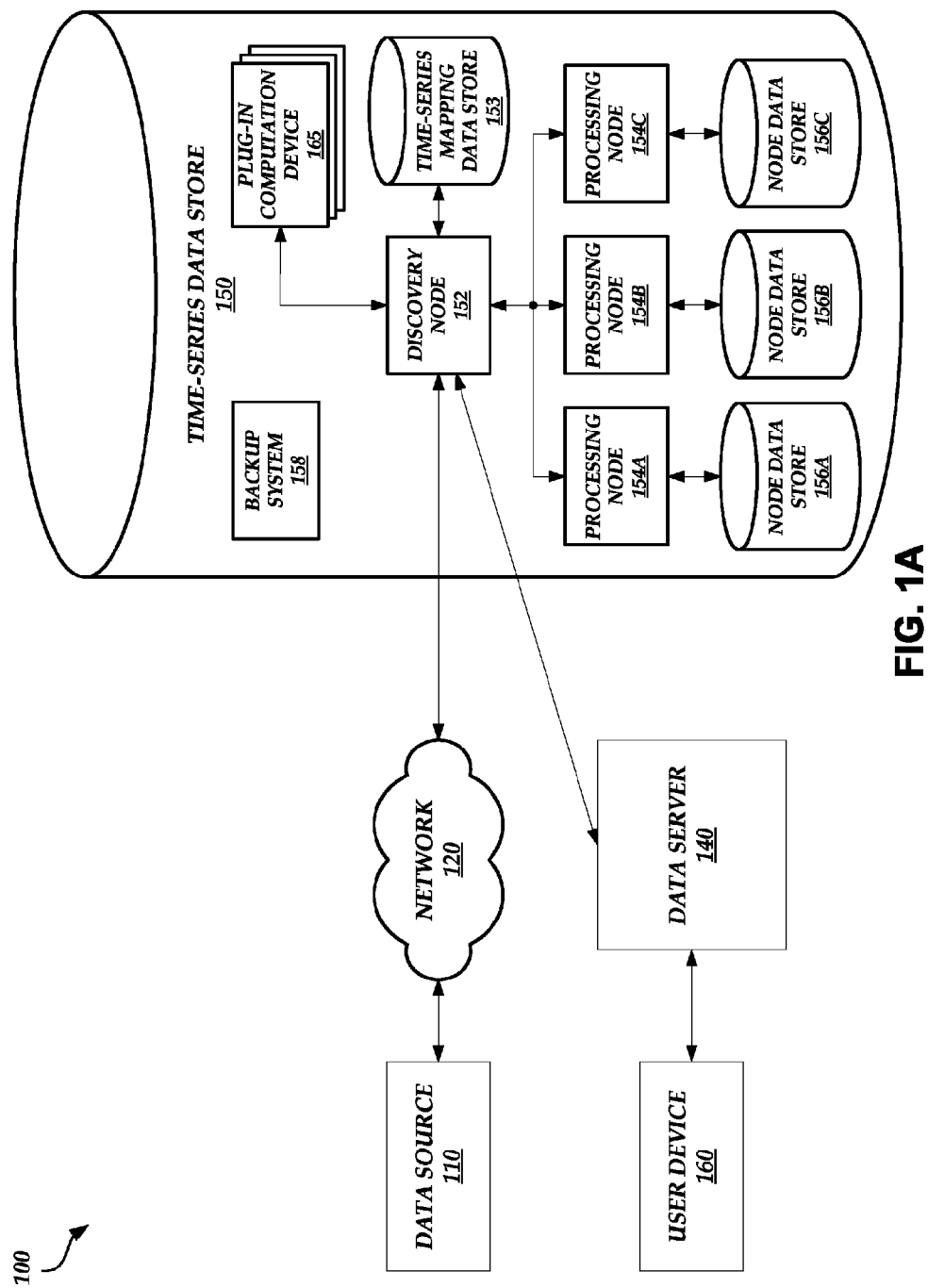
FIG. 1A illustrates a block diagram showing the various components of a time-series data storage and processing database system.

As described above, a user may attempt to analyze a portion of data stored in a database. For example, the user may attempt to analyze time-series data measured or captured by a data source. The user may attempt to analyze a single set of time-series data (for example, data measured or captured by a single data source over a period of time) or multiple sets of time-series data (for example, data measured or captured by different data sources over a period of time) at once. Such analysis may include viewing the time-series data at different periods of time, viewing the time-series data at different zoom levels, simultaneously viewing different time-series data over the same time period, combining (for example, adding, subtracting, dividing, multiplying, determining a ratio, determining a zScore, determining a square root, etc.) different time-series data to generate new time-series data, and/or the like.

Typically, a system that allows users to analyze the data stored in the database may include the database, a server, and a user device. The user device may provide information to the server regarding the type of analysis desired by the user. The server may retrieve the appropriate data from the database, perform the analysis, and provide the results to the user device for display. However, as the quantity of data stored in the database increases over time, there may be considerable delay in the retrieval of the data from database by the server. For example, the database may take a longer period of time to search in memory or on disk for the desired data.

In addition, network issues may contribute to the data retrieval delay. For example, the server and the database may be in communication via a wired or wireless network. The bandwidth of the network may be limited such that data can only be streamed from the database to the server at certain speeds. This can be problematic and inefficient because the computational power of the server may be at a level high enough such that the server can finish analyzing a first portion of data before a second portion is received from the database. Because the data may not be transmitted from the server to the user device until all of the data has been analyzed, the user may notice a delay in the display of the desired data.

Thus, it may be desirable to co-locate the hardware components that store the data and the hardware components that execute the instructions to perform the analysis. For example, instead of having the server perform the analysis, the database could be configured to perform the analysis. In such a scenario, the database may retrieve the desired data from memory or disk, perform the analysis, and provide the results to the server. The server may then immediately forward the results to the user device for display.

While some conventional databases perform a basic level of computation, these databases may not be suitable for replacing the functionality of the server. For example, some conventional databases can generate generic statistics based on the stored data. Such statistics may describe attributes of the stored data, such as mean data values, time ranges over which stored data is available, and/or the like. Furthermore, the statistics may be organized over preset time periods, such as days, months, or years. However, these conventional databases are not configured to perform arbitrary or custom analyses or computations. Moreover, these conventional databases do not allow for organizing data over custom time periods. For example, these conventional databases are not designed to receive a computational expression generated by another device (such as the server or the user device), execute the received computational expression on only the portion of stored data identified by the other device, and provide the results. Thus, conventional databases may be inadequately designed to reduce or eliminate the inefficiencies described above.

Accordingly, disclosed herein is a database system that includes components for storing time-series data and executing custom, user-defined computational expressions in substantially real-time such that the results can be provided to a user device for display in an interactive user interface. For example, the database system may include memory storage, disk storage, and/or one or more processors. Data received from a data source may include value and timestamp pairs. When the data is initially received from a data source, the data may be written to a write ahead log that is stored in memory and/or written to disk (e.g., such that the write ahead log can be restored if the database system crashes or experiences a forced shutdown). Although the write ahead log may be written to disk, the write ahead log may not be immutable. The data may be written in the write ahead log in the order received from the data source rather than in an order based on the timestamp values. The database system may maintain a mapping that indicates what portion of the data stored in the write ahead log is in order according to the timestamp values and what portion of the data stored in the write ahead log is not in order according to the timestamp values. The write ahead log may have a size limit and once the size limit is reached or about to be reached (or some other criteria is met, such as the passage of a threshold period of time), the data in the write ahead log may be flushed and written to disk. Using the write ahead log as a buffer and only writing to disk periodically or aperiodically may reduce the overhead associated with writing to disk. When writing to disk, the database system may use the mapping to reorder the data such that the data is written to disk in an order according to the timestamp values.

Data from a single data source may be written to a single data file or may be written to multiple data files. If written to multiple data files and the two or more of the data files include overlapping timestamp values, the data may be merged before any computations are performed, as described in greater detail below. Alternatively, the two or more data files may be compacted prior to any computations to generate a new data file, and the new data file may be used for any subsequent computations. Compacting the data files may be more efficient because then a merge operation may not need to be performed each time the same data files with overlapping timestamp values are requested by the user device.

Data written to disk may be immutable. Thus, the database system may not overwrite a portion of the data or append additional data to the written data once the data is written to disk. Because the data is immutable, all data written to disk can be memory mapped (for example, a segment of virtual or non-virtual memory can be assigned a direct byte-for-byte or bit-for-bit correlation with at least a portion of a data file) given that the location of the data will not change. Memory mapping the data files may decrease data retrieval times, especially for large data files, because a read operation may not be necessary to access the data (for example, because the data can be stored directly in memory) and/or the database system may not need to copy the data retrieved from disk into memory before the data is usable.

The database system may process stored time-series data in response to requests from a user device. For example, the user may request to view time-series data by manipulating an interactive user interface. The request, received by the database system from the user device (possibly via a server), may include a start time, an end time, a period, and/or a computational expression. The start time and end time may correspond with a range of timestamp values for which associated time-series data values should be retrieved. The period may indicate, when analyzed in conjunction with the start time and end time, a number of data points requested by the user device for display in the interactive user interface. As an example, the period may correspond with a time period that falls within the width of a pixel, where the interactive user interface displays a time-series data value associated with the start time and a time-series data value associated with the end time N pixels apart (e.g., where N corresponds to the number of data points requested by the user device).

The computational expression may indicate an arithmetic operation, if any, that the user wishes to perform on one or more sets of time-series data. Example arithmetic operations include a sum, a difference, a product, a ratio, a zScore, a square root, and/or the like. For example, the user may wish to combine the values in two different sets of time-series data. Thus, the user device may generate a computational expression that indicates that an addition operation is to be performed on data values in the first time-series data set and in the second time-series data set that correspond with timestamp values that fall between the start time and the end time.

The computational expression may identify a single arithmetic operation or may identify a nested or recursive set of arithmetic (and/or other types of) operations. For example, the computational expression may indicate that data values in a first time-series data set are to be added to data values in a second time-series data set, and the result of the addition is to be subtracted from data values in a third time-series data set.

Once the database system receives the request, the database system may begin retrieving the appropriate time-series data and performing the indicated arithmetic (and/or other types of) operations via the one or more processors. Depending on the type of indicated operation(s) to be performed, the one or more processors may perform pointwise operations or sliding window operations. For example, if performing an addition operation, the one or more processors may take single data values from the same time-series data file or from different time-series data files and execute the operation on the single data values to generate a new data value. As another example, if performing a zScore operation, the one or more processors may take a window of data values (for example, a plurality of data values) and execute the operation on the window of data values taken as a whole to generate a new data value.

The one or more processors can perform the indicated operations on time-series data sets that have matching timestamp values. For example, the one or more processors can execute an operation on data values from different time-series data sets if the data values correspond to the same timestamp value. In some cases, however, the timestamp values from two or more different time-series data sets may not align. In such a situation, the one or more processors may perform interpolation to estimate data values that may correspond to any missing timestamp values. The interpolation may occur prior to executing the operation or during execution of the operation (for example, interpolation may occur once the one or more processors receives a data value for a timestamp not present in another time-series data set that is being processed).

As described above, time-series data originating from a single data source may be stored in multiple data files. If the multiple data files include overlapping ranges of timestamp values (e.g., a first data file includes timestamps at a first time, a second time, and a third time, and a second data file includes timestamps at the second time, the third time, and a fourth time), then the data values in the multiple data files may be merged by the one or more processors before executing the operation (if, for example, the multiple data files were not already compacted into a new data file as described above). For example, if data values in the multiple data files each correspond to the same timestamp value, then the one or more processors may choose a data value from a most-recently modified file (or least-recently modified file) as the data value to be used for the timestamp value when executing the operation. To delete one or more data values that correspond to the same timestamp value (even if the data files are otherwise immutable), a reserved value can be written in association with the timestamp value to indicate that the previously written data value at the timestamp value should be deleted.

Thus, the one or more processors may generate new data values by performing a sequential scan of existing time-series data. As described above, because the data files may be memory mapped, the one or more processors can access the data files from memory, rather than from disk, to perform the indicated operations. The database system described herein may then achieve better performance while performing the sequential scan to produce the new data values when compared with conventional databases. Once all new data values have been generated, the database system may transmit the new data values to the user device (for example, via the server) for display in the interactive user interface.

In an embodiment, the immutable status of the data files written to disk enables the database system to generate quick and efficient data backups. For example, because the data files are immutable, the stored location of the data files on disk will not change. If new data is received from a data source, the new data may be stored in a different data file on disk. Generally, backups include a copy of the actual data file. However, because the location of a data file will not change, the backup can include a link to the location of the data file rather than a copy of the actual data file itself. Thus, the database system described herein may generate backups faster than conventional databases given that the process of generating links may be faster than the process of copying actual data files.

Example System Overview

FIG. 1A illustrates a block diagram showing the various components of a time-series data storage and processing database system 100. As illustrated in FIG. 1A, the time-series data storage and processing database system 100 may include a data source 110, a data server 140, a time-series data store 150, and a user device 160.

In an embodiment, the data source 110 may be any computing or mechanical device that can determine, measure, and/or capture data values. For example, the data source 110 may be a sensor, such as a sensor that measures physical parameters, a financial system, a medical electronic records system, and/or the like. While FIG. 1A illustrates a single data source 110, this is not meant to be limiting. The time-series data storage and processing database system 100 may include any number of data sources 110.

The data source 110 may transmit determined, measured, and/or captured time-series data to the time-series data store 150. In an embodiment, the data source 110 and the time-series data store 150 communicate via a network 120. The network 120 may include any communications network, such as the Internet. The network 120 may be a wired network, a wireless network, or a combination of the two. For example, network 120 may be a local area network (LAN) and/or a wireless area network (WAN). The network 120 may include cables and/or other equipment that allow the transport of data from underwater locations to aboveground locations and/or vice-versa.

The time-series data store 150 may store time-series data received from the data source 110 and perform analyses on the stored data based on requests received from the user device 160 via the data server 140. For example, as illustrated in FIG. 1, the time-series data store 150 may include a discovery node 152, a time-series mapping data store 153, processing nodes 154A-C, node data stores 156A-C, a backup system 158, and one or more plug-in computation devices 165. The discovery node 152 can be a single node or a cluster of nodes. Three processing nodes 154A-C and node data stores 156A-C are depicted for illustrative purposes only and is not meant to be limiting. The time-series data store 150 may include any number of processing nodes and/or node data stores.

In some embodiments, the time-series data received from various data sources 110 may be stored in different node data stores 156A-C. The time-series mapping data store 153 may store a mapping that identifies the processing node 154A-C that is associated with a time-series data set (and thus the node data store 156A-C in which the time-series data set is stored). In some embodiments, data corresponding to a single time-series are associated with multiple processing nodes 154A-C and/or multiple node data stores 156A-C (e.g., time-series data can be partitioned between different processing nodes 154A-C). When time-series data is received by the time-series data store 150 from a data source 110, the discovery node 152 may receive the time-series data, communicate with the time-series mapping data store 153 to determine the processing node 154A-C associated with the time-series data, and transmit the time-series data to the appropriate processing node 154A-C. Alternatively, the data source 110 can cache information indicating the processing node 154A-C that is associated with a time-series data set such that the data source 110 can transmit the time-series data directly to the appropriate processing node 154A-C. The processing node 154A-C may then store the received time-series data in the associated node data store 156A-C (after, for example, the write ahead log(s) of the processing node 154A-C are flushed, as described in greater detail below with respect to FIGS. 1B and 5A-5D). The processing node 154A-C may also perform compaction operations, as described in greater detail below with respect to FIGS. 5A-5D.

Likewise, when a user device 160 or data server 140 provides a computational expression to the time-series data store 150, the discovery node 152 may analyze the computational expression to identify the time-series data upon which an arithmetic (and/or other type of) operation may be performed. The discovery node 152 may communicate with the time-series mapping data store 153 to identify the processing node(s) 154A-C associated with the identified time-series data. The computational expression, along with the start time, the end time, and the period, may be transmitted to the processing node 154A that is associated with the identified time-series data. Alternatively, the user device 160 or data server 140 can cache information indicating the processing node 154A-C that is associated with a time-series data set such that the user device 160 or data server 140 can analyze the computational expression to identify the time-series data upon which the arithmetic (and/or other type of) operation may be performed and transmit the computational expression, along with the start time, the end time, and the period, directly to the appropriate processing node 154A-C. If the computational expression identifies a plurality of time-series data sets that are associated with different processing nodes 154A-C, then the discovery node 152 may select one of the processing nodes 154A-C to perform the arithmetic operation(s). The selected processing node 154A-C may retrieve time-series data from another processing node 154A-C (for example, time-series data that is not associated with the selected processing node 154A-C) in order to perform the arithmetic operation(s). While the description herein refers to "arithmetic operations" for simplicity, any other type of mathematical operation may similarly be performed on the time-series data.

A processing node 154A-C may use the start time, the end time, the period (for example, a value that identifies a duration of time), and the computational expression to manipulate time-series data and/or to generate new time-series data. For example, the processing node 154A-C may perform the transformation(s) (e.g., the arithmetic operation(s)) identified by the computational expression on the time-series data identified by the computational expression for data values in the time-series data that correspond with timestamp values that fall between the start time and the end time (interpolating when necessary as described herein). If the period of time between each timestamp value is less than the period received from the user device 160 or data server 140, then the processing node 154A-C may aggregate data values (for example, average, sum, subtract, minimum, maximum, etc.) after (or prior to) applying the arithmetic operation(s) such that the number of data values equals the number of periods between the start time and the end time. For example, if the start time is 1:00 pm, the end time is 1:01 pm, the period is 10 seconds, and the timestamp values of a time-series data set increment every 1 second, then the period of time between each timestamp value (for example, 1 second) is less than the period (for example, 10 seconds) and the number of periods between the start time and the end time is 6. The processing node 154A-C may aggregate data values corresponding to the first 10 timestamp values (for example, data values corresponding to times 1:00:01 pm through 1:00:10 pm), the second 10 timestamp values (for example, data values corresponding to times 1:00:11 pm through 1:00:20 pm), and so on until the processing node 154A-C has generated 6 aggregated data values. The processing node 154A-C may repeat this process for each identified time-series data set. In some cases, a single time-series data set may not have a fixed period between data values. Thus, the processing node 154A-C may aggregate a portion of data values (e.g., the portion of data values for which the period of time between each timestamp value is less than the period received from the user device 160 or data server 140). In some embodiments, the processing node 154A-C performs the arithmetic operation(s) before aggregating the data values. In other embodiments, the processing node 154A-C performs the arithmetic operation(s) using the aggregated data values.

As described herein, the processing nodes 154A-C can perform pointwise operations and/or sliding window operations. When performing pointwise operations, the processing nodes 154A-C may apply the arithmetic operation(s) on single data values (for example, data values corresponding to the same timestamp value). When performing sliding window operations, the processing nodes 154A-C may apply the arithmetic operation(s) on a window of data values (for example, data values corresponding to a range of timestamp values).

Once the arithmetic operation(s) identified by the computational expression are applied to the appropriate data values, the processing nodes 154A-C may aggregate the results into a new time-series data set. The new time-series data set may be stored in the associated node data store 156A-C. Alternatively or in addition, the new time-series data set may be transmitted to the data server 140 (which then forwards the new time-series data set to the user device 160) and/or the user device 160.

In alternate embodiments, one or more plug-in computation devise 165 perform the transformation (e.g., the arithmetic operation) in place of the processing nodes 154A-C. For example, a user via the user device 160 can generate a custom arithmetic operation and information defining the custom arithmetic operation can be stored in one or more plug-in computation devices 165 for execution. The discovery node 152 may store information indicating which plug-in computation device 165 stores the custom arithmetic operation generated by a particular user or user device 160. Thus, when a request for performing an arithmetic operation is received from the user device 160 or the data server 140, the discovery node 152 can identify the appropriate plug-in computation device 165 and forward the request to the appropriate plug-in computation device 165. Once the request is received, the plug-in computation device 165 requests the appropriate data via the discovery node 152. As described above, the discovery node 152 can identify the time-series data upon which an arithmetic (and/or other type of) operation may be performed. The discovery node 152 may communicate with the time-series mapping data store 153 to identify the processing node(s) 154A-C associated with the identified time-series data. The associated processing node(s) 154A-C can then use the start time, the end time, and the period to retrieve the appropriate time-series data from the node data store(s) 156A-C and forward such time-series data to the plug-in computation device 165 via the discovery node 152.

The plug-in computation device 165 can manipulate the time-series data and/or generate new time-series data in the same manner as described above with respect to the processing nodes 154A-C. In some cases, the custom arithmetic operation includes nested operations that are each performed by different plug-in computation devices 165. For example, each plug-in computation device 165 may have a declared capability (e.g., the ability to perform a particular transformation or operation on time-series data). The discovery node 152 or another component of the time-series data store 150 can identify the plug-in computation device 165 that corresponds with an individual operation in the nested operations and can instruct such plug-in computation devices 165 to perform their respective operation. Alternatively, one plug-in computation device 165 may perform a first operation in the nested operations and instruct other plug-in computation devices 165 to perform other operations in the nested operations on some or all of the received time-series data to complete the manipulation of the time-series data and/or the generation of the new time-series data. The plug-in computation device 165 then transmits the manipulated time-series data and/or the generated new time-series data to the discovery node 152. The discovery node 152 can instruct the appropriate processing node 154A-C to store the received time-series data in the appropriate node data store 156A-C. The discovery node 152 can also send the received time-series data to the user device 160 or the data server 140.

While the one or more plug-in computation devices 165 are illustrated as being internal to the time-series data store 150, this is not meant to be limiting. One or more of the plug-in computation devices 165 can be located external to the time-series data store 150 and can communicate with the time-series data store 150 to perform the operations described herein via the network 120.

In some embodiments, the discovery node 152 (or another component of the time-series data store 150, such as the processing nodes 154A-C) summarizes the received time-series data before transmitting to the user device 160 or the data server 140. For example, the discovery node 152 can process the received time-series data (e.g., downsample the received time-series data, group time-series data corresponding to the same pixel, determine data points in the received time-series data that correspond to a pixel, etc.) such that the data points sent to the user device 160 or the data server 140 are just those data points that will be displayed in a user interface. In other words, the time-series data store 150 can return a single data point per pixel in return to receiving an arithmetic operation request. By processing the raw received time-series data to select specific data points for transmission to the user device 160 or the data server 140 (e.g., thereby sending less data than otherwise would be sent if the user device 160 or the data server 140 received all data points manipulated or generated by the plug-in computation device 165), the time-series data store 150 can reduce the latency involved in processing a received arithmetic operation request.

In some embodiments, the computational expression includes no arithmetic operations to be performed. For example, this may occur if the user scrolls or pans within a time-series data set displayed in the interactive user interface, thus requesting to view time-series data that was not previously visible within the interactive user interface. In such a situation, the processing nodes 154A-C may not generate new time-series data, but may instead retrieve and provide a different set of data values than was previously provided for display in the interactive user interface.

The backup system 158 may include one or more computing devices that are configured to backup data stored in one or more of the node data stores 156A-C. Additional details on the techniques implemented by the backup system 158 are described below with respect to FIG. 7.

The data server 140 may receive requests from the user device 160 (for example, the computational expression, the start time, the end time, and the period) and forward such requests to the time-series data store 150. The data server 140 may also receive updated time-series data and/or new time-series data from the time-series data store 150 and forward such data to the user device 160 for display in the interactive user interface.

The data server 140 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof. In one embodiment, the data server 140 may be implemented in a Java Virtual Machine (JVM) that is executing in a distributed or non-distributed computer system. In other embodiments, the data server 140 may be implemented as a combination of programming instructions written in any programming language (e.g. C++, Visual Basic, Python, etc.) and hardware components (e.g., memory, CPU time) that have been allocated for executing the program instructions.

The user device 160 may transmit requests for updated or new time-series data to the data server 140 for transmission to the time-series data store. Such requests may include the start time, the end time, the period, and/or the computational expression. The requests may be generated in response to the manipulation of the interactive user interface by a user. Manipulations may include panning, scrolling, zooming, selecting an option to modify, combine and/or aggregate one or more time-series data sets to produce a new time-series data set, and/or the like. For example, the user may be viewing, via the interactive user interface, a first time-series data set that illustrates a first physical parameter (e.g., temperature) associated with a component and a second time-series data set that illustrates a second physical parameter (e.g., humidity) associated with the component. The user may then select an option to view the values of the first and second physical parameters associated with the component. Selection of this option may cause the user device 160 to generate a computational expression that identifies the first time-series data set, the second time-series data set, and an arithmetic operation (for example, addition). The selection may also cause the user device 160 to identify the start time and the end time, which can be user-defined and/or based on an earliest timestamp value and a latest timestamp value currently viewable in the interactive user interface. The selection may also cause the user device 160 to identify the period, which may be user-defined and/or may be the range of time between the start time and the end time that corresponds with the width of a pixel. The range of time may be determined based on the zoom level of a graph depicting time-series data. Thus, the period may be dependent on the number of pixels in the horizontal direction (if time is along the x-axis) or vertical direction (if time is along the y-axis) that are devoted to displaying the requested time-series data.

Once updated or new time-series data is received from the data server 140 and/or directly from the time-series data store 150, the user device 160 may update user interface data used by the user device 160 to render and display the interactive user interface to display the data and timestamp value pairs. In other embodiments, the data server 140 may update the user interface data and provide the updated user interface data to the user device 160.

The user device 160 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices 160 may execute a browser application to communicate with the data server 140.

Figure 1B:
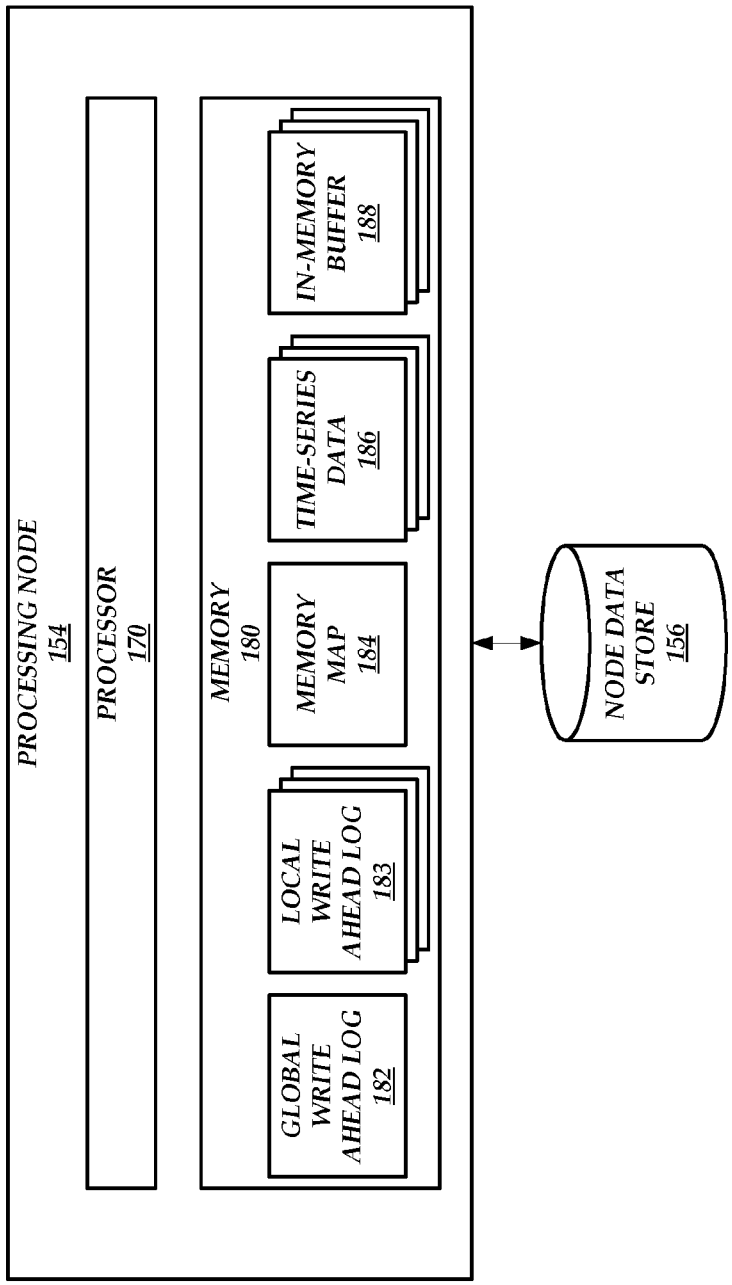
FIG. 1B illustrates a more detailed block diagram of a processing node, such as a processing node of FIG. 1A.

FIG. 1B illustrates a more detailed block diagram of a processing node, such as a processing node 154A-C of FIG.

1A. As illustrated in FIG. 1B, the processing node 154 may include a processor 170 and memory 180. While a single processor 170 is depicted, this is not meant to be limiting. The processing node 154 may include any number of processors 170. The processor 170 may retrieve time-series data from the memory 180 and/or the node data store 156 to perform requested arithmetic operation(s).

The memory 180 may store a global write ahead log 182, one or more local write ahead logs 183, a memory map 184, one or more time-series data files 186, and one or more in-memory buffers 188. For example, as described in greater detail below with respect to FIG. 6, when time-series data is initially received from the data source 110, the processing node 154 may initially store the received time-series data in a global write ahead log 182 and in one or more in-memory buffers 188. The time-series data may be written in the global write ahead log 182 in the order received from the data source 110 rather than in an order based on the timestamp values in the time-series data. Each in-memory buffer 188 may correspond with a time-series and the time-series data may be written to the in-memory buffer 188 that corresponds with the time-series of the respective time-series data. The global write ahead log 182 may have a data size limit and once the size limit is reached or about to be reached (or some other criteria is met, such as the passage of a threshold period of time), the time-series data in the in-memory buffers 188 can be flushed and stored in local write ahead logs 183, where each local write ahead log 183 corresponds to a time-series. The processing node 154, in the memory 180 or in another hardware component, may maintain a mapping that indicates what portion of the time-series data stored in the local write ahead logs 183 is in order according to the timestamp values and what portion of the time-series data stored in the local write ahead logs 183 is not in order according to the timestamp values. For example, the first four entries in a first local write ahead log 183 may be in order according to timestamp values and the second four entries in the first local write ahead log 183 may be in order according to timestamp values. However, the first four entries and the second four entries may not be in order according to timestamp values.

The local write ahead logs 183 may also have a data size limit and once the size limit is reached or about to be reached (or some other criteria is met, such as the passage of a threshold period of time), the time-series data in the local write ahead logs 183 may be flushed and written to disk (for example, the node data store 156) as time-series data files. When writing to disk, the processing node 154 may use the mapping to reorder the time-series data such that the time-series data is written to disk in an order according to the timestamp values. For example, using the example above, the processing node 154 may reorder the first four entries and the second four entries such that all eight entries are written to disk in an order according to the timestamp values. The processing node 154 may also perform a compaction of written time-series data files, if necessary, as described in greater detail below with respect to FIGS. 5A-5D.

The memory map 184 may identify the segments of the memory 180 that are assigned to at least a portion of a data file of a time-series (for example, the time-series data files 186). The memory 180 may use the memory map 184 to identify the location of at least a portion of the time-series data files 186 requested by the processor 170. As described herein, the use of the memory map 184 may decrease data retrieval times, especially for large time-series data files, because a read operation on the node data store 156 may not be necessary to access the time-series data (for example, because the time-series data can be stored directly in the memory 180) and/or the processing node 154 may not need to copy the time-series data retrieved from the node data store 156 into the memory 180 before the data is usable. For example, the processor 170 may request a data value stored in a particular page of a time-series data file. An expectation may be that the processor 170 may then subsequently request another data value that follows the initial data value or that is within a range of the initial data value, where both data values are stored in the same page or in contiguous pages. Thus, by loading at least a portion (e.g., at least a page) of a time-series data file 186 into memory 180, a read operation on the node data store 156 may not be necessary.

The time-series data files 186 may be stored in the memory 180 (for example, after the time-series data files have been written to the node data store 156). Alternatively, a portion of the time-series data files 186 may be stored in the memory 180, such as one or more pages of a respective time-series data file 186. The operating system of the processing node 154 may determine if or when to perform read operations to pull data from the node data store 156 into the memory 180.

Example State Diagrams

Figure 2A:
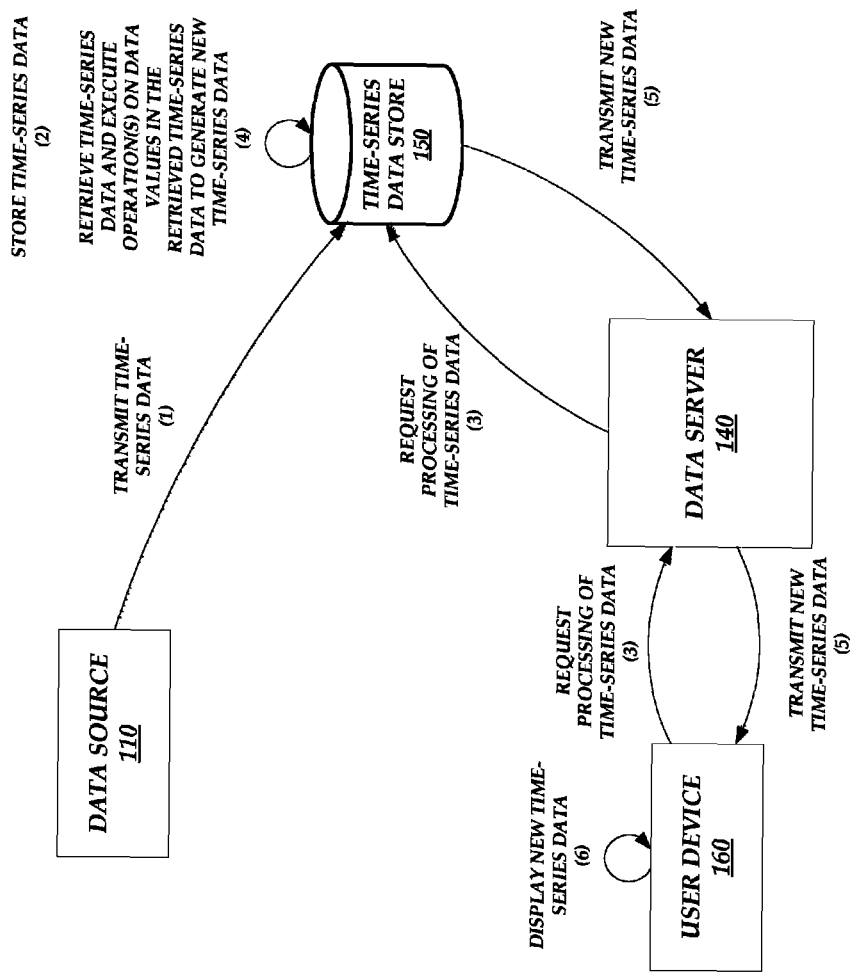
FIGS. 2A-2C illustrate example state diagrams that depict the process of retrieving and manipulating time-series data.
Figure 2B:
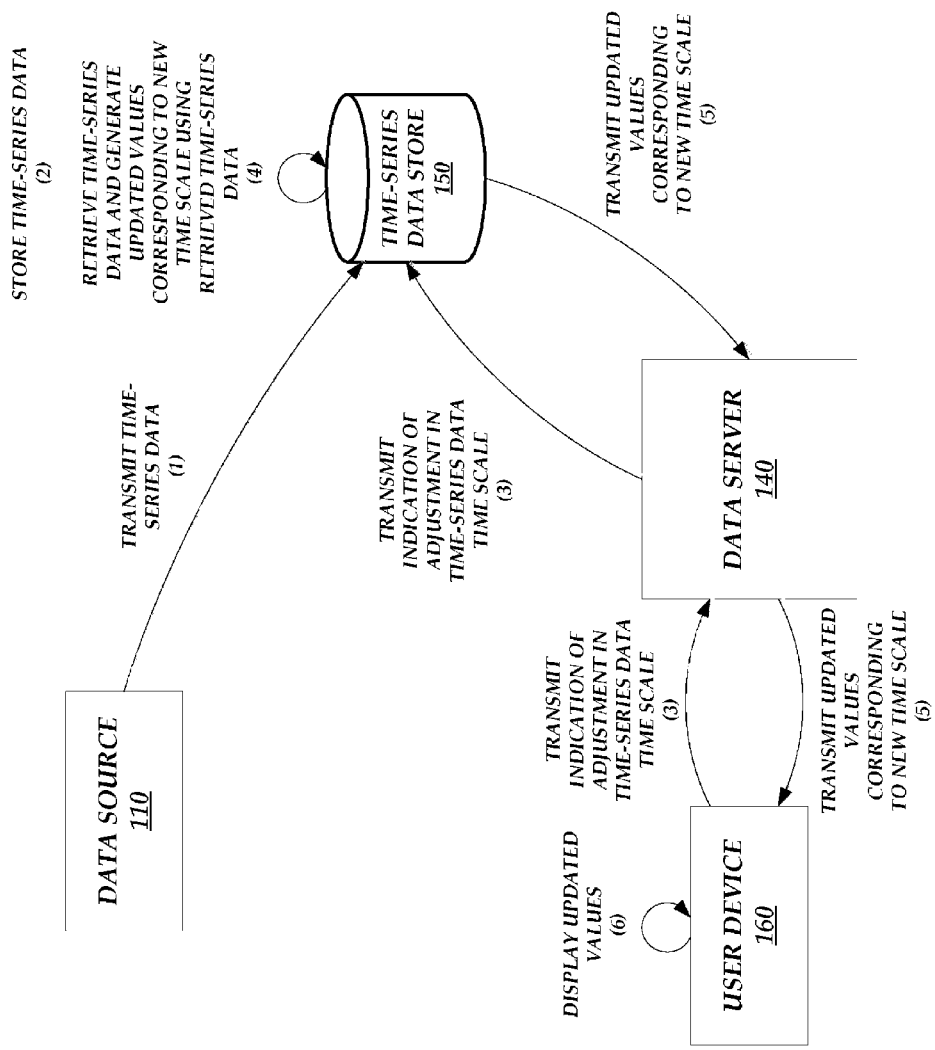
Figure 2C:
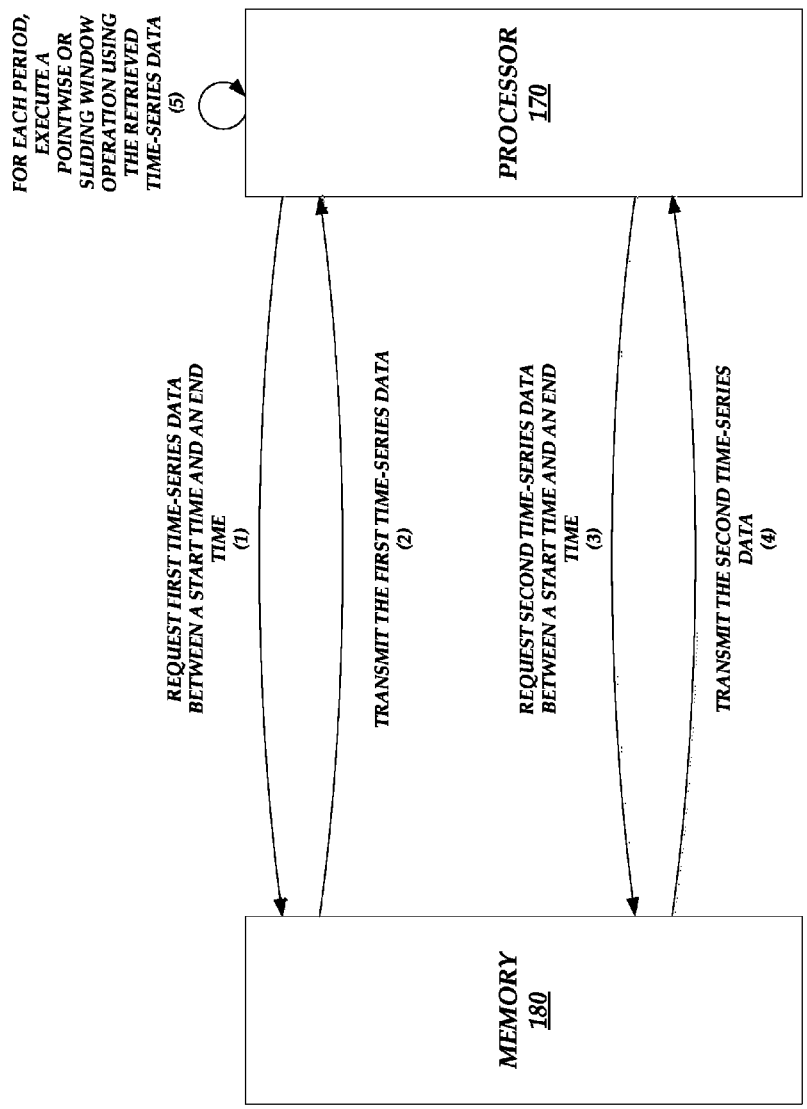

FIGS. 2A-2C illustrate example state diagrams that depict the process of retrieving and manipulating time-series data. As illustrated in FIG. 2A, the data source 110 may transmit time-series data (1) to the time-series data store 150. The time-series data store 150 may store the time-series data (2). Once written to disk, the file including the time-series data may be immutable.

At some time after the time-series data is stored in the time-series data store 150, a user may manipulate the interactive user interface displayed by the user device 160 in a way that causes the user device 160 to request processing of time-series data (3) from the data server 140. For example, the user may pan, scroll, zoom, select an option to modify, combine, and/or aggregate time-series data, and/or the like. The request may include the start time, the end time, the period, and/or the computational expression.

The data server 140 may forward the request to the time-series data store 150. Using information in the request, the time-series data store 150 may retrieve time-series data identified in the computational expression and execute arithmetic operation(s) on data values in the retrieved time-series data to generate new time-series data (4). Execution of the arithmetic operation(s) may involve pointwise operations and/or sliding window operations.

The time-series data store 150 may transmit the new time-series data (5) to the data server 140. The data server 140 may then forward the new time-series data to the user device 160. In some embodiments, the data server 140 aggregates the new time-series data into a different format (e.g., a format more understandable by humans, a format that can be more easily displayed by the user device 160, etc.) before forwarding the new time-series data to the user device 160. The user device 160 may display the new time-series data (6) in the interactive user interface.

The state diagram depicted in FIG. 2B is similar to the state diagram depicted in FIG. 2A. However, the user manipulation of the interactive user interface displayed by the user device 160 may cause the user device 160 to transmit an indication of an adjustment in the time-series data time scale (3). For example, such manipulation may include panning a graph displayed in the interactive user interface, scrolling through the graph displayed in the interactive user interface, and/or changing a zoom level depicted in the graph displayed in the interactive user interface. The indication may include the start time, the end time, the period, and/or the computational expression.

The indication may be received by the data server 140 and forwarded to the time-series data store 150. Using information in the indication, the time-series data store 150 may retrieve time-series data identified in the computational expression and generate updated values corresponding to the new time scale using the retrieved time-series data (4). For example, the time-series data store 150 may generate the updated values by executing arithmetic operation(s) on data values in the retrieved time-series data.

The time-series data store 150 may transmit the updated values corresponding to the new time scale (5) to the data server 140. The data server 140 may then forward the updated values to the user device 160. The user device 160 may display the updated values (6) in the interactive user interface.

FIG. 2C illustrates an example state diagram depicting the processes performed by a processing node 154 in the time-series data store 150 when analyzing and performing the computational expression (for example, steps (4) in FIGS. 2A-2B). For example, the processor 170 may request first time-series data between a start time and an end time (1) from the memory 180. The memory 180 may then transmit the first time-series data (2) to the processor 170.

Optionally, the processor 170 may request second time-series data between a start time and an end time (3) from the memory 180 (if, for example, the computational expression identifies the second time-series data). The memory 180 may then transmit the second time-series data (4) to the processor 170.

For each period, the processor 170 may execute a pointwise or sliding window operation using the retrieved time-series data (5). The processor 170 (with or without the use of the memory 180 or additional memory to store intermediate states) may execute a pointwise or sliding window operation based on the type of arithmetic operation identified in the computational expression. For example, the processor 170 may execute a pointwise operation if the arithmetic operation is addition and the processor 170 may execute a sliding window operation if the arithmetic operation is a moving average.

Example Interactive User Interfaces

Figure 3A:
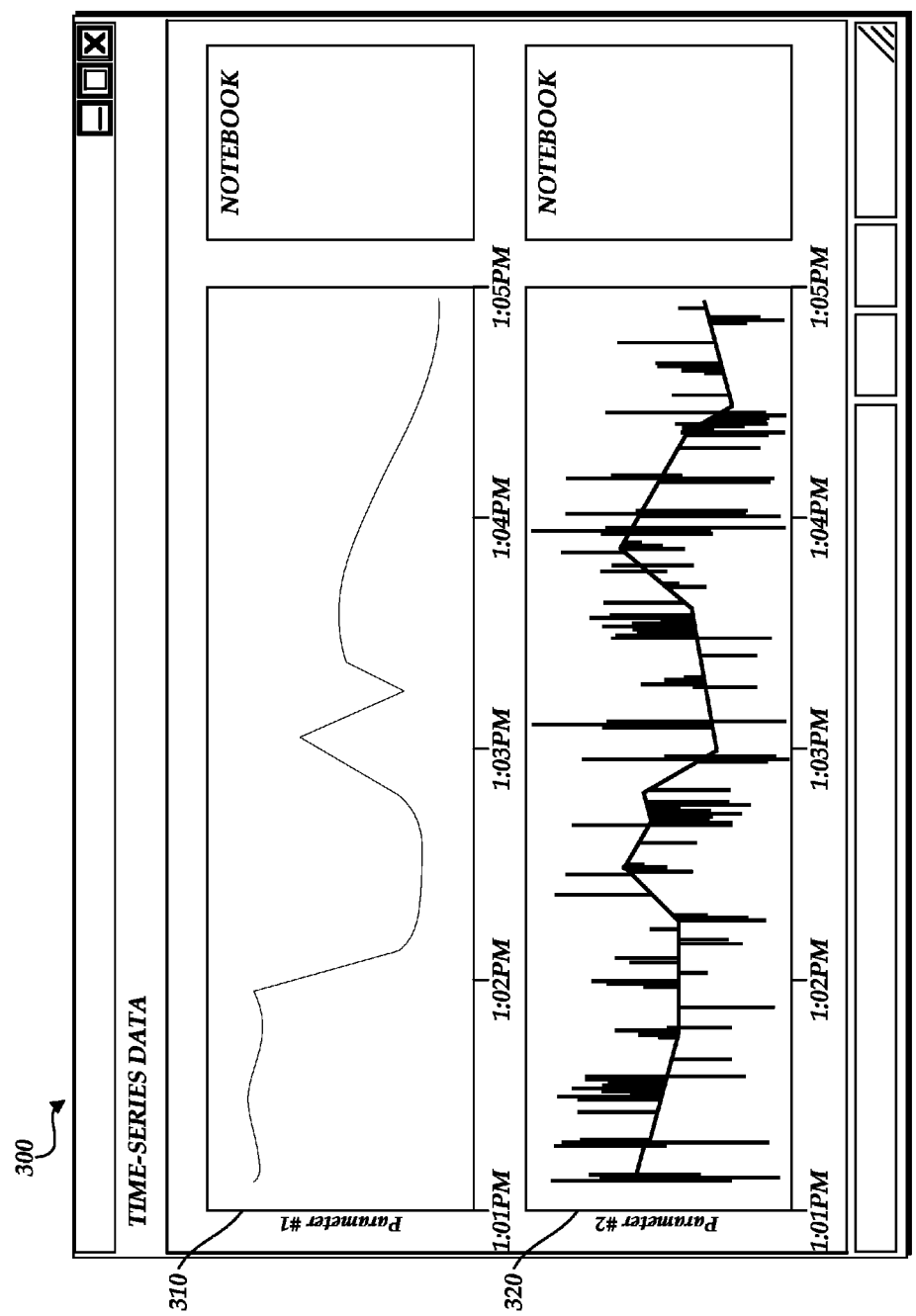
FIGS. 3A-3B illustrate an interactive user interface depicting graphs of time-series data that may be generated and displayed by a user device, such as the user device of FIG. 1A.
Figure 3B:
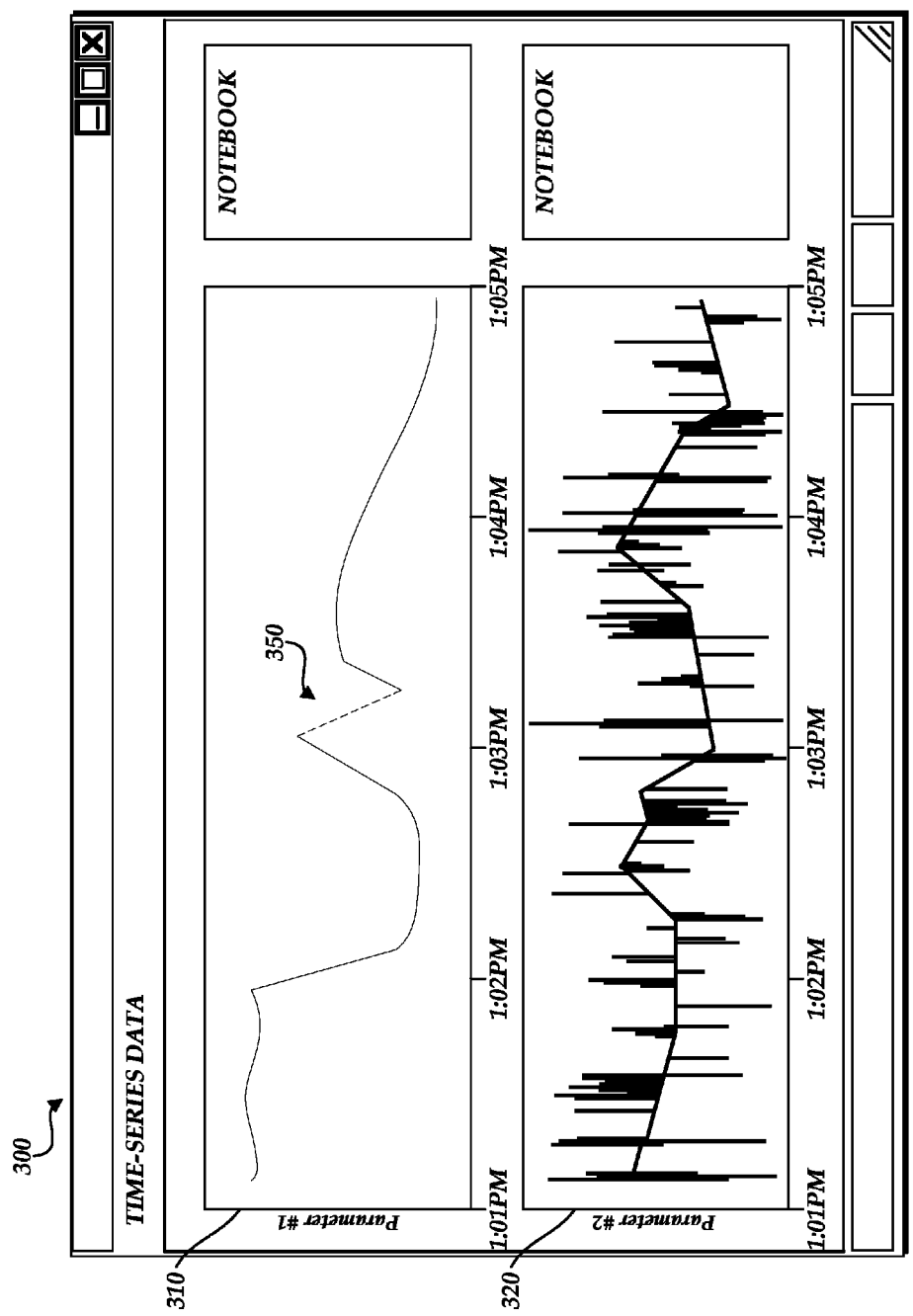

FIGS. 3A-3B illustrate an interactive user interface 300 depicting graphs of time-series data that may be generated and displayed by a user device, such as the user device 160. As illustrated in FIG. 3A, the interactive user interface 300 includes a graph 310 displaying time-series data showing water allocation values over time and a graph 320 displaying time-series data showing temperature values over time.

If, for example, the user manipulates the graph 310, then the user device 160 may generate a start time, an end time, a period, and a computational expression to transmit to the time-series data store 150. The start time may be 1:01 pm and the end time may be 1:05 pm given that these times correspond with the earliest timestamp and the latest timestamp visible in the interactive user interface 300. The number of pixels in the horizontal direction between a data value corresponding to the earlier timestamp and a data value corresponding to the latest timestamp may dictate the value of the period. For example, if 240 pixels exist between these two data points, then the period may be 1 second (for example, there may be 240 seconds between 1:05 pm and 1:01 pm and thus each pixel may correspond to 1 second).

The computational expression may identify the time-series data set displayed in the first graph 310. The computational expression may also identify the time-series data set displayed in the second graph 320 if, for example, the user selects an option to view a time-series data set that comprises some combination (for example, addition, subtraction, ratio, etc.) of the time-series data sets displayed in the graphs 310 and 320. Finally, the computational expression may also identify any arithmetic operation(s) to be performed.

As illustrated in FIG. 3B, portion 350 in the graph 310 includes gaps in data values. For example, data values in the gaps may not have been stored in the time-series data store 150. If the user desired to view a time-series data set that comprised some combination of the time-series data sets in the graphs 310 and 320, then the time-series data store 150 may use interpolation to estimate possible data values associated with the timestamp values in which data is missing. The interpolated data, along with the actual stored data, may then be used to generate the new time-series data set.

As described herein, the computational expression may include a nested set of arithmetic operations. FIG. 3C illustrates an example nested set of arithmetic operations. As illustrated in FIG. 3C, a first arithmetic operation may include the addition of data values from the time-series data displayed in the graph 310 with data values from the time-series data displayed in the graph 320. The second arithmetic operation may include the division of data values from the time-series data displayed in the graph 320 over the results from the first arithmetic operation. A computed set of time-series data 330 is output as a result of the computational expression. The computed set of time-series data 330 may then be displayed to the user in one of the graphs 310 or 330, and/or another graph of the user interface. While two arithmetic operations are depicted, this is not meant to be limiting. A computational expression may include any number of nested or un-nested arithmetic operations. Further, while, for clarity of description, FIG. 3C illustrates a computational expression performed on displayed time series data, in other embodiments computational expressions are performed on time-series data that may not be displayed. For example, the user may request a display of a graph of time-series data that may only be produced by execution of a computational expression on two or more time-series of data. As a result, the system may automatically access the necessary time-series of data (as described above and below), execute the computational expression (as described above and below), and then provide the requested time-series date for display to the user (e.g., to the user device, as described above).

Example Data Directory

Figure 4A:
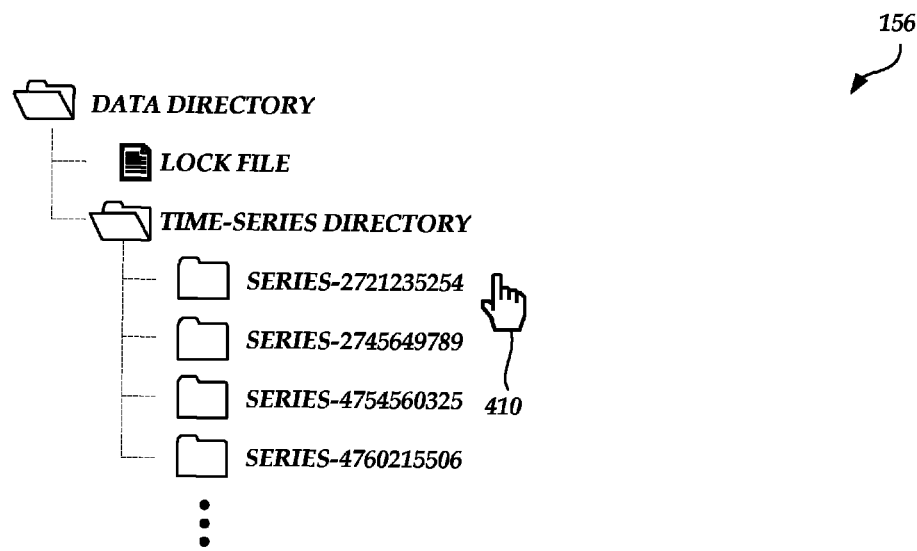
Figure 4B:
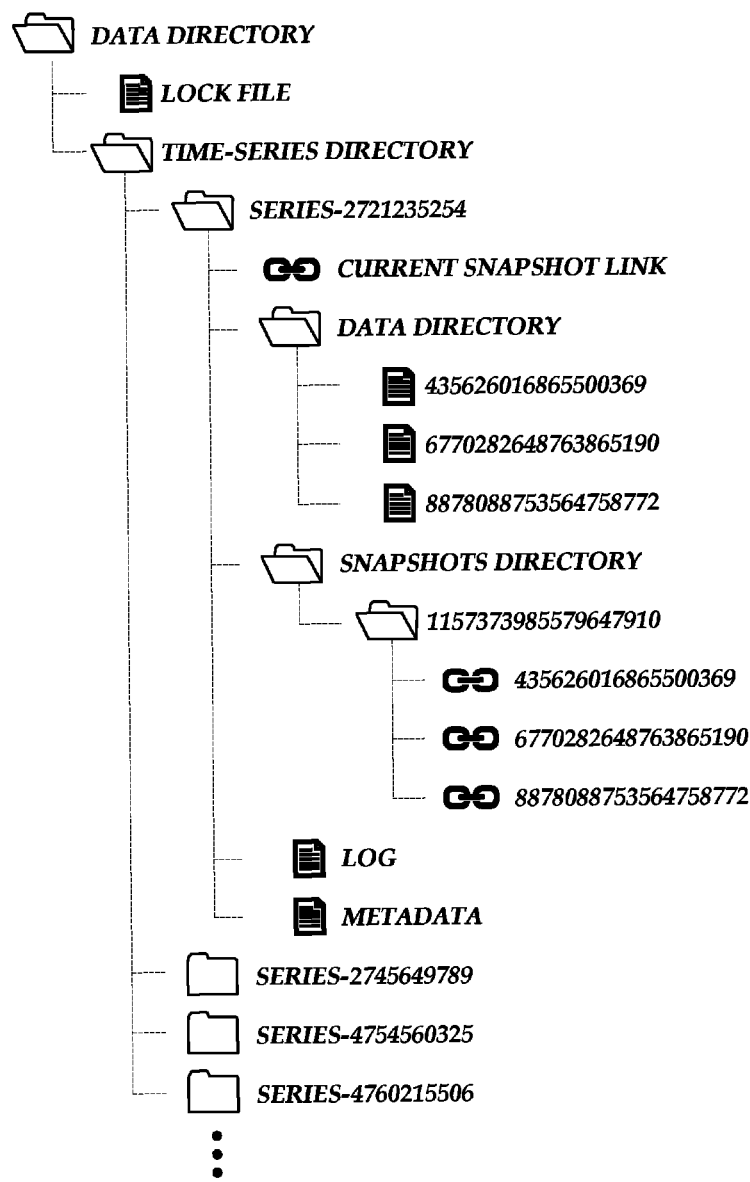

FIGS. 4A-4C illustrate an example file structure as stored in a node data store, such as a node data store 156A-C. As illustrated in FIG. 4A, a data directory may include a lock file and a time-series directory. The lock file may be used to prevent another instance from writing and/or reading from the data directory when a write operation is occurring. The time-series directory may include one or more subfolders that are each associated with a time-series data set.

For example, using cursor 410, subfolder series-2721235254 may be selected. Selection of the subfolder displays additional links, files, and subdirectories that may be representative of the contents of the other time-series directory subfolders, as illustrated in FIG. 4B. Series-2721235254 may include a data directory that includes one or more time-series data files, where the time-series data files may be immutable. While the series-2721235254 subfolder may correspond to a single time-series data set, the data may be separated into separate files. In some cases, the different time-series data files may include overlapping timestamp values. In such a situation, the processing node 154 may perform a merge operation as the data is used when executing arithmetic operation(s). For example, when the processing node 154 comes across a timestamp value corresponding to two or more different values, the processing node 154 may select the data value from the most-recently modified file (or the least-recently modified file) as the data value to use in computations. A special value (e.g., a reserved value) may be written at the time of the data value that is not selected to be used in computations. The special value will eventually be removed once the time-series data files are compacted. Alternatively, the processing node 154 may compact two or more time-series data files to generate a single new time-series data file in which overlapping timestamp value issues are resolved (for example, the new time-series data file includes a single data value for each timestamp value, where the data value is determined in a manner as described above). The new time-series data file may then be used in future computations in place of the original time-series data files used to generate the new time-series data file.

Series-2721235254 may also include a current snapshot link that links to the snapshots directory. The snapshots directory can be a staging location for an in-progress snapshot when a time-series data file is being added or compacted. As described above, the time-series data files may be immutable and thus the location in the node data store 156 is unchanged. Thus, the snapshots directory may include links, rather than actual copies of data. Each of the links in the snapshots directory may link to the time-series data file identified by the name of the link. The state of a time-series can be changed with a single file system operation (e.g., a single atomic file system operation) to change a current snapshot link associated with the time-series.

Series-2721235254 may also include a log file, which may be the write ahead log described herein. Series-2721235254 may also include a metadata file that includes key-value pairs about the time-series. For example, the information in the metadata file may include a Unicode identification of the time-series and an indication of whether the data values are stored as floats or doubles.

Raw data 450 received from a data source 110 and stored in the time-series data files may be in the form of data and timestamp value pairs, as illustrated in FIG. 4C. The data values may be stored as integers, floats, doubles, and/or the like. The timestamp values may be absolute values (for example, wall clock time) or relative values (for example, the amount of time that has passed since the last data value was measured). The data and/or timestamp values can be compressed prior to storage in the time-series data files. The time-series data files or a separate file may further include an index indicating the location of the compressed data and/or timestamp values.

Example Compression and Compaction Operations

As described above, the data and/or timestamp values can be compressed prior to storage in the time-series data files. For example, the processing nodes 154A-C can perform block compression by grouping the data values together and grouping the timestamp values together and then compressing each group. This may result in a higher level of compression because the processing nodes 154A-C can take advantage of similarities in the data values and similarities in the timestamp values to perform the compression. As another example, the processing nodes 154A-C can perform an out of the box compression by dividing time-series data files into one or more blocks and compressing the one or more blocks. In some embodiments, the processing nodes 154A-C store a block index at the beginning of each compressed time-series data file to identify the data range that each block includes. As another example, the processing nodes 154A-C can perform a delta-based compression (e.g., storing and/or compressing the difference in data values and timestamp values rather than the raw values themselves).

Compression may provide several benefits. For example, compressing the time-series data files reduces the amount of data stored in the node data stores 156A-C, saving on storage costs. As another example, compressing the time-series data files can increase the data read speed because a smaller amount of data needs to be read from the node data stores 156A-C to satisfy a request. While the processing nodes 154A-C decompress the compressed time-series data files before satisfying a request, the time to compress and/or decompress the time-series data files is outweighed by the reduction in time for reading data from the node data stores 156A-C.

In an embodiment, the processing nodes 154A-C periodically compact time-series data files to reduce the amount of data stored in the node data stores 156A-C and to increase data read times (e.g., by reducing the number of data files that are parsed to perform a read operation). Compaction, however, can reduce the performance of the time-series data store 150 because compaction can involve performing a large number of write operation. Accordingly, the time-series data store 150 described herein implements a compaction scheme that reduces a number of compaction operations that are performed while still achieving the benefits of compaction. For example, the processing nodes 154A-C can group time-series data files based on their respective file size. Once the number of time-series data files of a particular size exceeds a threshold number, the time-series data files can be compacted into a single time-series data file of a larger size. Once the number of time-series data files of the larger size exceeds a threshold number, the time-series data files can be compacted into a single time-series data file of an even larger size, and so on.

Figure 5A:
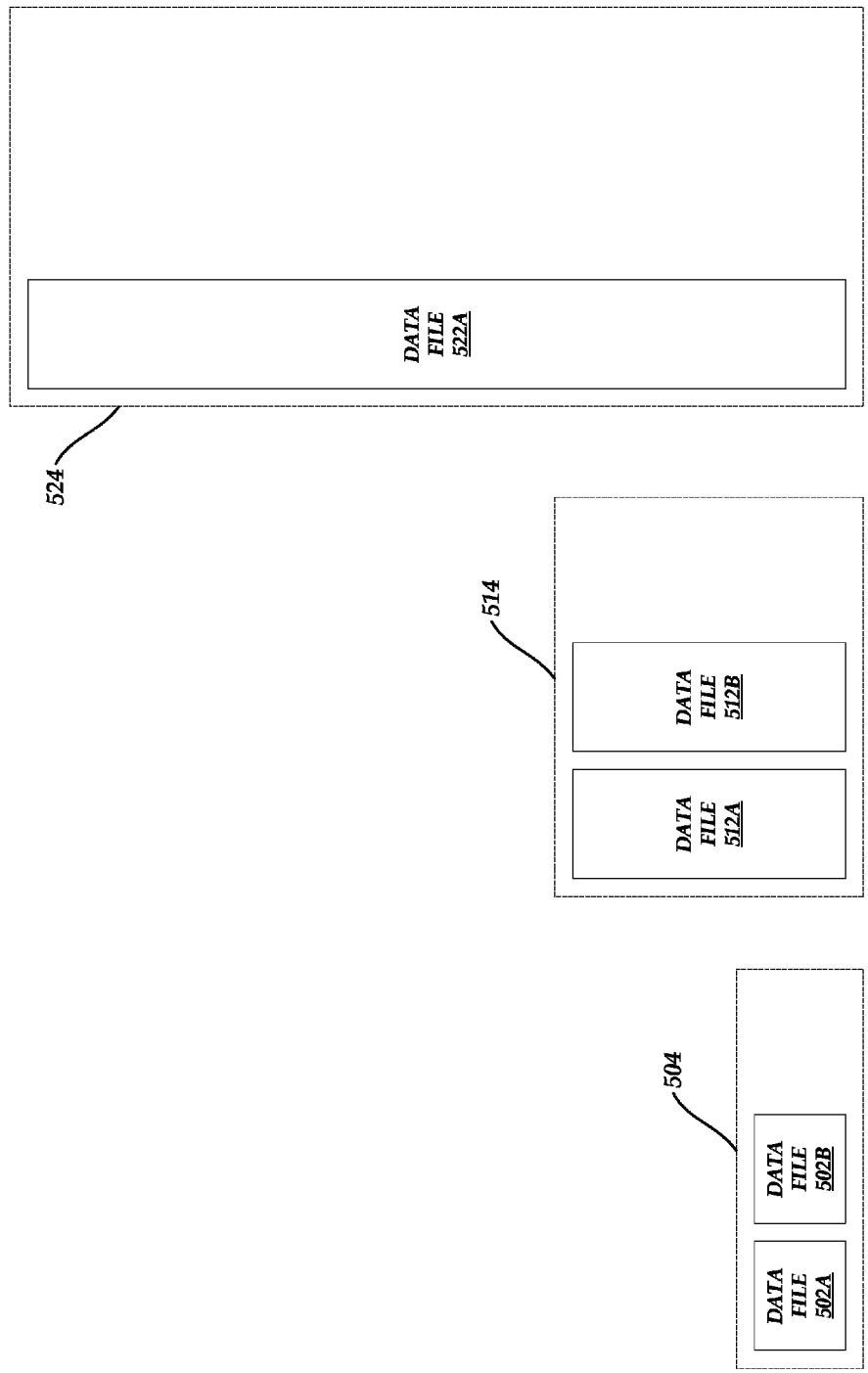

FIG. 5A is a block diagram depicting several time-series data files 502A-B, 512A-B, and 522A grouped into buckets 504, 514, and 524, respectively. As an example, any data file grouped into the bucket 504 has a data size within a first range, any data file grouped into the bucket 514 has a data size within a second range, and any data file grouped into the bucket 524 has a data size within a third range. Alternatively or in addition, any data file grouped into the bucket 504 has a creation time that is later than the creation time of any data file grouped into the buckets 514 or 524. Likewise, any data file grouped into the bucket 514 may have a creation time that is later than the creation time of any data file grouped into the bucket 524. Bucketing the data files by creation time may ensure that even if multiple data correspond to the same time instant, the most-recently written data will be included in any compacted data file. While three buckets 504, 514, and 524 are depicted, this is not meant to be limiting. Any number of buckets can be used to perform the compaction scheme.

In an embodiment, the first range, the second range, and the third range are contiguous. The first range, the second range, and the third range can be of equal size or of different sizes. The size of each range may depend on the threshold number of data files that are allowed to be within a certain size range before compaction occurs. For example, as illustrated in FIG. 5A, three data files are allowed to have a data size within the first range, the second range, or the third range before compaction occurs. However, this is not meant to be limiting as any threshold number of data files can be set to fall within a range before compaction occurs (e.g., 2, 4, 5, 6, etc.). Because the threshold number is three in this illustrative example, the first range can be from 0 to 3000 bytes, the second range can be from 3001 bytes to 9000 bytes, and the third range can be from 9001 bytes to 27,000 bytes.

FIG. 5B is a block diagram depicting a new time-series data file 502C that has been generated and that is grouped into the bucket 504. Because three data files 502A-C exist that fall within the first range, a processing node 154A-C can initiate a compaction operation. The processing node 154A-C can compact the data files 502A-C to form a single data file 512C that has a size that falls within the second range and that is grouped into the bucket 514, as illustrated in FIG. 5C. Because the data files 502A-C have been compacted, the individual data files 502A-C can be marked for deletion.

In addition, compaction of the data files 502A-C results in three data files 504A-C that fall within the second range. Thus, the processing node 154A-C may perform another compaction operation to compact the data files 512A-C to form a single data file 522B, as illustrated in FIG. 5D. Like with the data files 502A-C, because the data files 512A-C have been compacted, the individual data files 512A-C can be marked for deletion. In other embodiments, not shown, the processing node 154A-C can perform a single compaction operation by compacting the data files 502A-C and the data files 512A-B at once to form the data file 522B. The compacted data files 512C and/or 522B can be stored in the appropriate node data store 156A-C.

When time-series data is flushed from a local write ahead log 183 to be written to disk as a time-series data file, the time-series data file may be of a data size that falls within the first range. Thus, the above compaction scheme described above can be repeated once three time-series data files are formed from flushed time-series data. The compaction scheme described above reduces the number of write operations because the cascading or chained compaction results in smaller time-series data files being compacted more often than larger time-series data files.

In some embodiments, a large amount of time-series data may be written to disk at once. In such a situation, the number of time-series data files that fall within the first range, for example, may immediately exceed the threshold number. Rather than writing the time-series data files to disk and then performing the compaction, the processing nodes 154A-C can predict which time-series data files would be compacted and compact such time-series data files first before writing the files to disk. Thus, only the compacted time-series data file would be written to the node data store 156A-C.

A separate file, referred to herein as a journal, may keep track of which time-series data files apply to a time-series. As time-series data files are written, compacted, and/or marked for deletion, such information can be stored in the journal. The journal may replace the use of a file system that maintains metadata identifying a time-series associated with a particular time-series data file. The journal further can be compressed to reduce the file size of the journal. If the time-series data store 150 crashes, the journal can be used to reconstruct the time-series data files.

Write Ahead Logs

Figure 6:
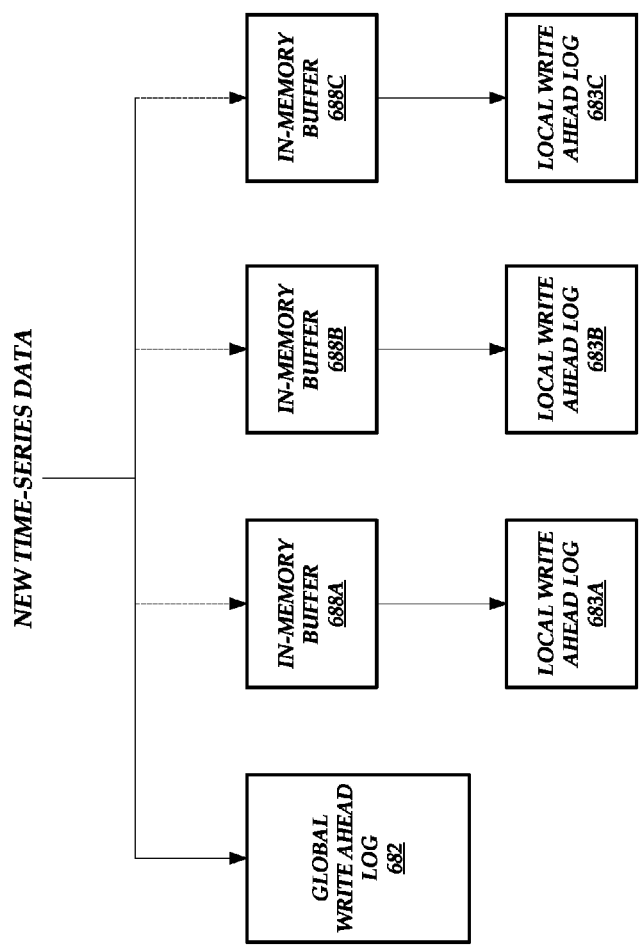
FIG. 6 is a block diagram depicting a global write ahead log, in-memory buffers, and local write ahead logs.

FIG. 6 is a block diagram depicting a global write ahead log 682, in-memory buffers 688A-C, and local write ahead logs 683A-C. As described above, the global write ahead log 182, the local write ahead logs 183, and/or the in-memory buffers 188 can temporarily store time-series data before such data is written to disk. Alternatively, the global write ahead log 182 and/or the local write ahead logs 183 can be files stored on disk (and thus do not temporarily store time-series data). The global write ahead log 182, the local write ahead logs 183, and the in-memory buffers 188 can increase time-series data store 150 performance by allowing the processing nodes 154A-C to write a large amount of data to specific locations on disk rather than a small amount of data to different locations on disk.

As illustrated in FIG. 6, new time-series data is initially stored in the global write ahead log 682. The global write ahead log 682 may store time-series data in an order based on the order in which the data is received from the data source 110. In addition, the new time-series data may be stored in one of the in-memory buffers 688A-C. Each in-memory buffer 688A-C is associated with a specific time-series, and thus the new time-series data may be stored in the in-memory buffer 688A-C that is associated with the time-series of the data. While three in-memory buffers 688A-C are depicted, this is for illustrative purposes only and is not meant to be limiting. Any number of in-memory buffers 688 can be present. The global write ahead log 682 can be used to reconstruct the data in the in-memory buffers 688A-C if the time-series data store 150 crashes or fails. Because the data in the in-memory buffers 688A-C are organized by time-series, the in-memory buffers 688A-C can be used to serve read requests if such requests are received before the time-series data is written to disk.

When the capacity of the global write ahead log 682 is reached or about to be reached (or some other criteria is met, such as the passage of a threshold period of time), new time-series data that is received can be stored in a new global write ahead log 682 and the data stored in the in-memory buffers 688A-C are pushed to the local write ahead logs 683A-C for storage. The local write ahead logs 683A-C may also be associated with a specific time-series, and thus the in-memory buffers 688A-C can transfer data to the local write ahead logs 683A-C that are associated with the same time-series as the in-memory buffers 688A-C. For example, the in-memory buffer 688A transfers data to the local write ahead log 683A, the in-memory buffer 688B transfers data to the local write ahead log 683B, and the in-memory buffer 688C transfers data to the local write ahead log 683C. While three local write ahead logs 683A-C are depicted, this is for illustrative purposes only and is not meant to be limiting. Any number of local write ahead logs 683A-C can be present.

When the capacity of the local write ahead logs 683A-C is reached or about to be reached (or some other criteria is met, such as the passage of a threshold period of time), the data stored in each local write ahead log 683A-C can be packaged into one or more time-series data files and written to disk. This may be more efficient than just including a single global write ahead log 682 and writing time-series data to disk when the single global write ahead log 682 reaches its data capacity because received time-series data may correspond to many different time-series. The time-series are generally stored in different locations on disk. Thus, writing a first data point to a first location, writing a second data point to a second location, writing a third data point to the first location, writing a fourth data point to a third location, and so on, as would be done if writing from a single global write ahead log 682, can be less efficient than performing a batch write using data in each of the local write ahead logs 683A-C, where a large number of data points are written to the same or similar location on disk at once given that the data in each local write ahead log 683A-C corresponds to the same time-series.

In some embodiments, an in-memory buffer 688A-C can reach its capacity before the global write ahead log 682 reaches its capacity. In such a situation, the data in the in-memory buffer 688A-C can be flushed and directly written to disk as a time-series data file. A separate file can keep track of the fact that this data has already been written to disk such that the data is not written to disk twice.

Data Backups

As described above, the backup system 158 can backup data stored in the node data stores 156A-C. The data can be backed up to external storage (not shown). Because the time-series data files may be immutable, the backup system 158 can copy and backup the data files without having to determine whether a particular data file has been modified. In other words, once a time-series data file is backed up, the backup system 158 no longer has to access that data file or backup an updated version of the data file. Thus, the immutable characteristic of the time-series data files allows the backup system 158 to efficiently implement an incremental backup scheme.

For example, the first time a backup is requested, the backup system 158 can take a snapshot of the data files currently stored in one or more of the node data stores 156A-C. The next time a backup is requested, the backup system 158 can determine which data files have been written to disk since the initial backup and only backup those data files, which is referred to herein as an incremental backup since only a portion of the data files in the node data stores 156A-C are included in the backup (e.g., only the new data files). For example, data files may be associated with a file number (that may or may not be sequential). The backup system 158 can record the file number of the last data file included in the last backup. Thus, any data files that have a file number higher than the recorded file number is included in the next incremental backup. The incremental backup may also keep track of which data files have been deleted. For example, the incremental backup can include a list of all data files that exist as of when the incremental backup is taken. Thus, if a data file is included in the data file list of one incremental backup, but is not included in the data file list of the next incremental backup, then it can be determined that the data file has been deleted. As another example, the incremental backup can include a list of data files that have been deleted since the last incremental backup or snapshot. To perform a restore operation, the backup system 158 can take the initial snapshot and then apply each incremental backup that has been performed and stored.

The backup system 158 may backup data in the node data stores 156A-C by time-series. For example, the backup system 158 can backup data corresponding to a first time-series, then data corresponding to a second time-series, and so on.

In an embodiment, when a backup is triggered, a global state of the time-series data store 150 is changed to indicate that a backup is triggered. If new time-series data is received, the processing node 154A-C can check to see whether the global state has indicated that a backup is triggered. If the global state does not indicate that a backup is triggered, then the processing node 154A-C operates as described above. Otherwise, a copy of the global write ahead log 182 and/or the local write ahead logs 183 is made and any changes (e.g., data being stored in the global write ahead log 182, data being stored in the local write ahead logs 183, data files being compacted, data files being written to disk, etc.) are tracked separately.

If the backup system 158 reaches data corresponding to a time-series before new data corresponding to the time-series (e.g., data received after the backup is triggered) is written to disk (e.g., as determined based on the separately tracked changes), then the backup system 158 copies all of the data files corresponding to the time-series for storage in the external storage. Otherwise, the backup system 158 copies only those data files that correspond to the time-series and that were written before the backup was triggered (e.g., as determined based on the separately tracked changes). If a compaction occurs after the backup is triggered, the compacted data files are marked for deletion after the backup is complete such that the compacted data files are not left out of the backup.

Figure 7:
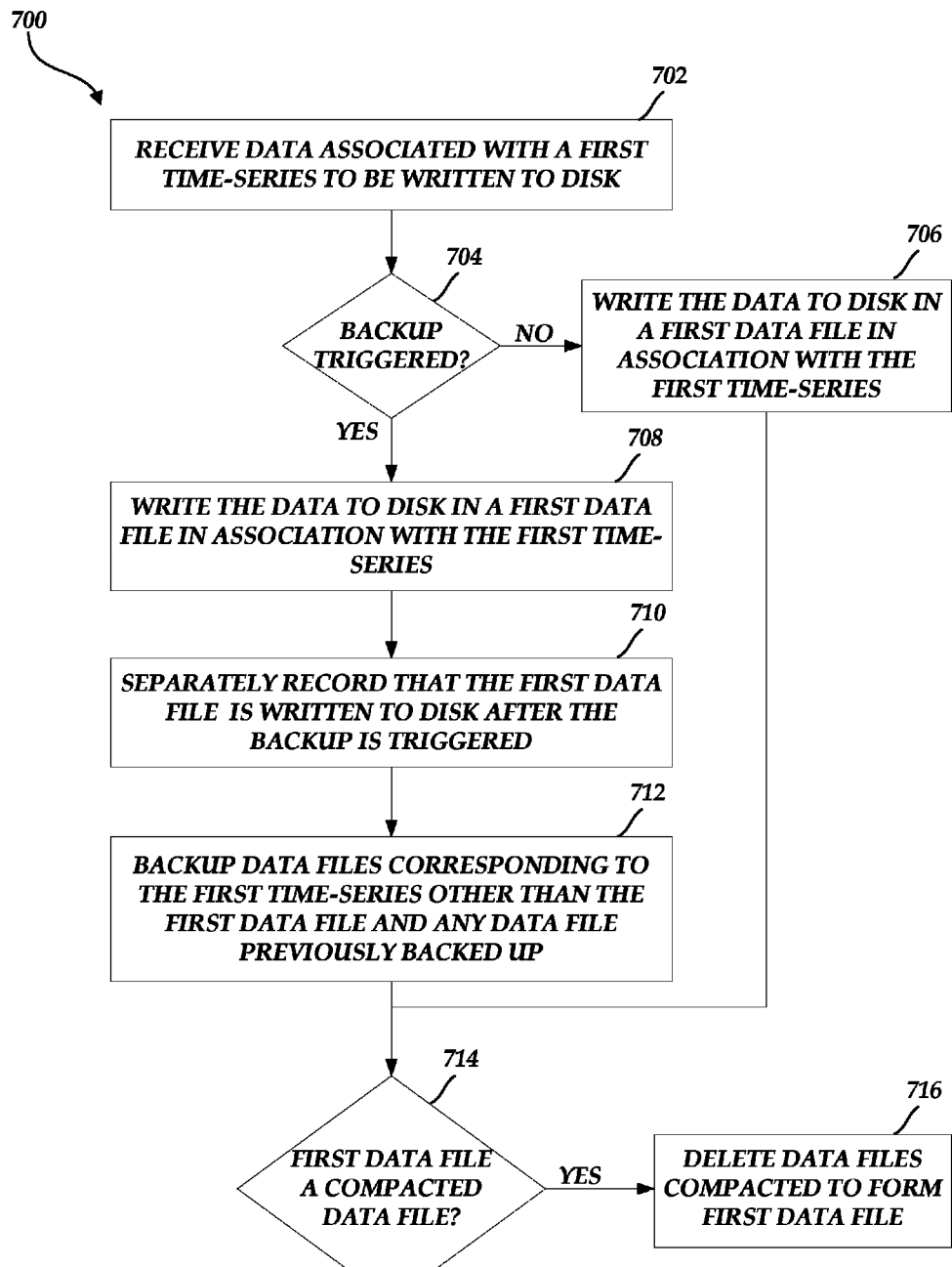
FIG. 7 is a flowchart depicting an illustrative operation of backing up time-series data.

FIG. 7 is a flowchart 700 depicting an illustrative operation of backing up time-series data. Depending on the embodiment, the method of FIG. 7 may be performed by various computing devices, such as by the time-series data store 150 described above. Depending on the embodiment, the method of FIG. 7 may include fewer and/or additional blocks and the blocks may be performed in an order different than illustrated.

In block 702, data associated with a first time-series to be written to disk is received. The data may be stored in a global write ahead log 182, a local write ahead log 183, and/or in an in-memory buffer 188.

In block 704, a determination is made as to whether a backup is triggered. For example, a global state of the time-series data store 150 may indicate whether a backup is triggered. If a backup is triggered, the flowchart 700 proceeds to block 708. Otherwise, the flowchart 700 proceeds to block 706.

In block 706, the data is written to disk in a first data file in association with the first time-series. The data may be written to disk after the global write ahead log 182 or one or more local write ahead logs 183 are flushed. The flowchart 700 proceeds to block 714 after the block 706 is complete.

In block 708, the data is written to disk in a first data file in association with the first time-series. The data may be written to disk after the global write ahead log 182 or one or more local write ahead logs 183 are flushed.

In block 710, the first data file being written to disk after the backup is triggered is separately recorded. For example, a copy of the global write ahead log 182, the local write ahead logs 183, and/or other files can be made to track changes that occur after the backup is triggered.

In block 712, data files corresponding to the first time-series other than the first data file and any data file previously backed up are backed up. For example, the backup system 158 can perform an incremental backup, where the incremental backup does not include any new data received after the backup is triggered.

In block 714, a determination is made as to whether the first data file is a compacted data file. If the first data file is a compacted data file, then the flowchart 700 proceeds to block 716. Otherwise, the flowchart 700 ends.

In block 716, data files compacted to form the first data file are deleted. In an embodiment, the data files compacted to form the first data file are marked for deletion after the backup is completed if a backup had been triggered.

Example Process Flows

Figure 8A:
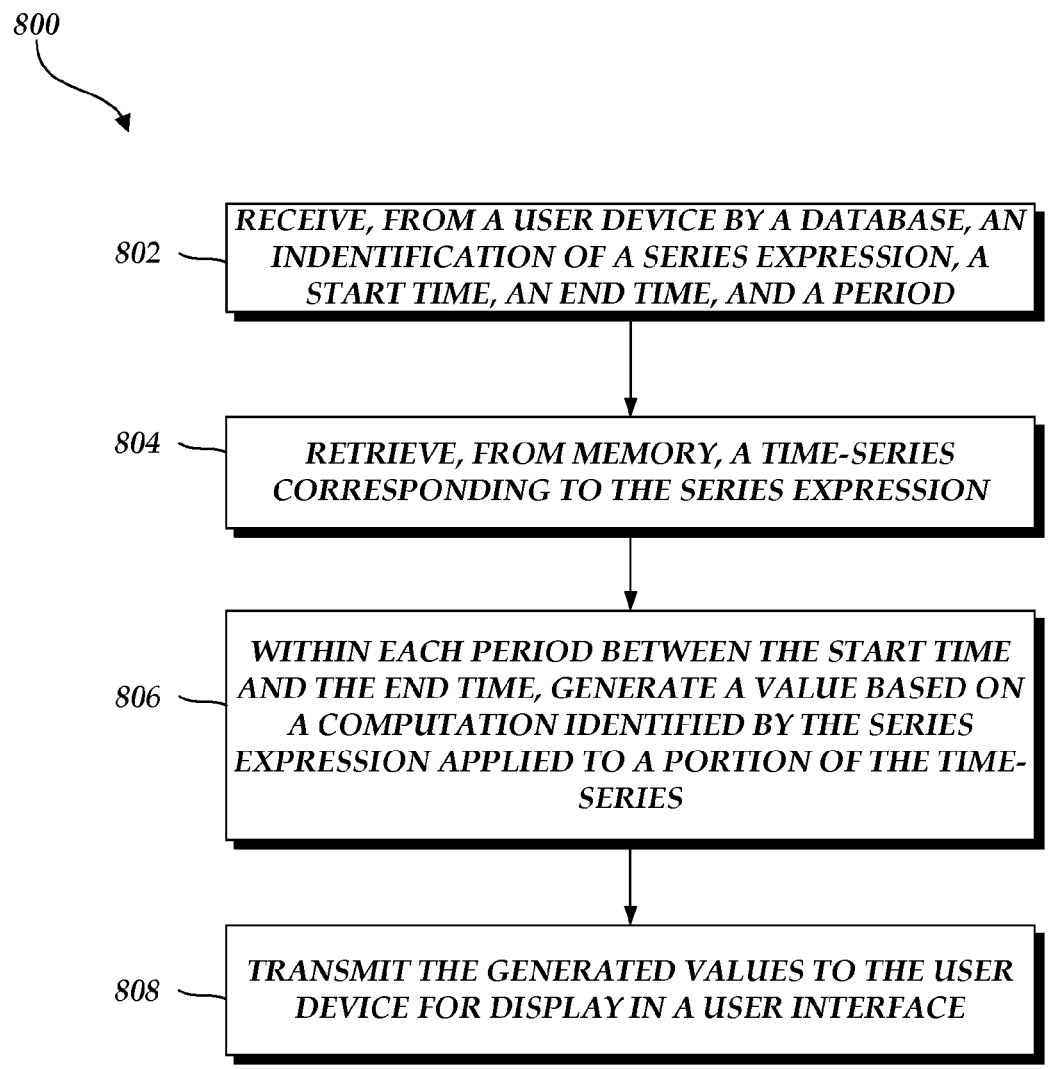
FIG. 8A is a flowchart depicting an illustrative operation of processing time-series data by a database for display in an interactive user interface.

FIG. 8A is a flowchart 800 depicting an illustrative operation of processing time-series data by a database for display in an interactive user interface. Depending on the embodiment, the method of FIG. 8A may be performed by various computing devices, such as by the time-series data store 150 described above. Depending on the embodiment, the method of FIG. 8A may include fewer and/or additional blocks and the blocks may be performed in an order different than illustrated.

In block 802, an identification of a series expression, a start time, an end time, and a period may be received from a user device. For example, the series expression may be a computational expression. The series expression may identify one or more arithmetic operations and one or more time-series data sets upon which the arithmetic operations are to be performed.

In block 804, a time-series data file corresponding to the series expression may be retrieved from memory. The time-series data file may be a data file associated with a time-series data set identified by the series expression.

In block 806, within each period between the start time and the end time, a value based on a computation identified by the series expression applied to a portion of the time-series data file is generated. For example, the computation may be one or more arithmetic operations. The computation may be applied to data values stored in the time-series data file that are associated with timestamp values that fall between the start time and the end time.

In block 808, the generated values may be transmitted to the user device for display in a user interface, such as an interactive user interface. In some embodiments, the generated values are also stored in the node data store 156.

Figure 8B:
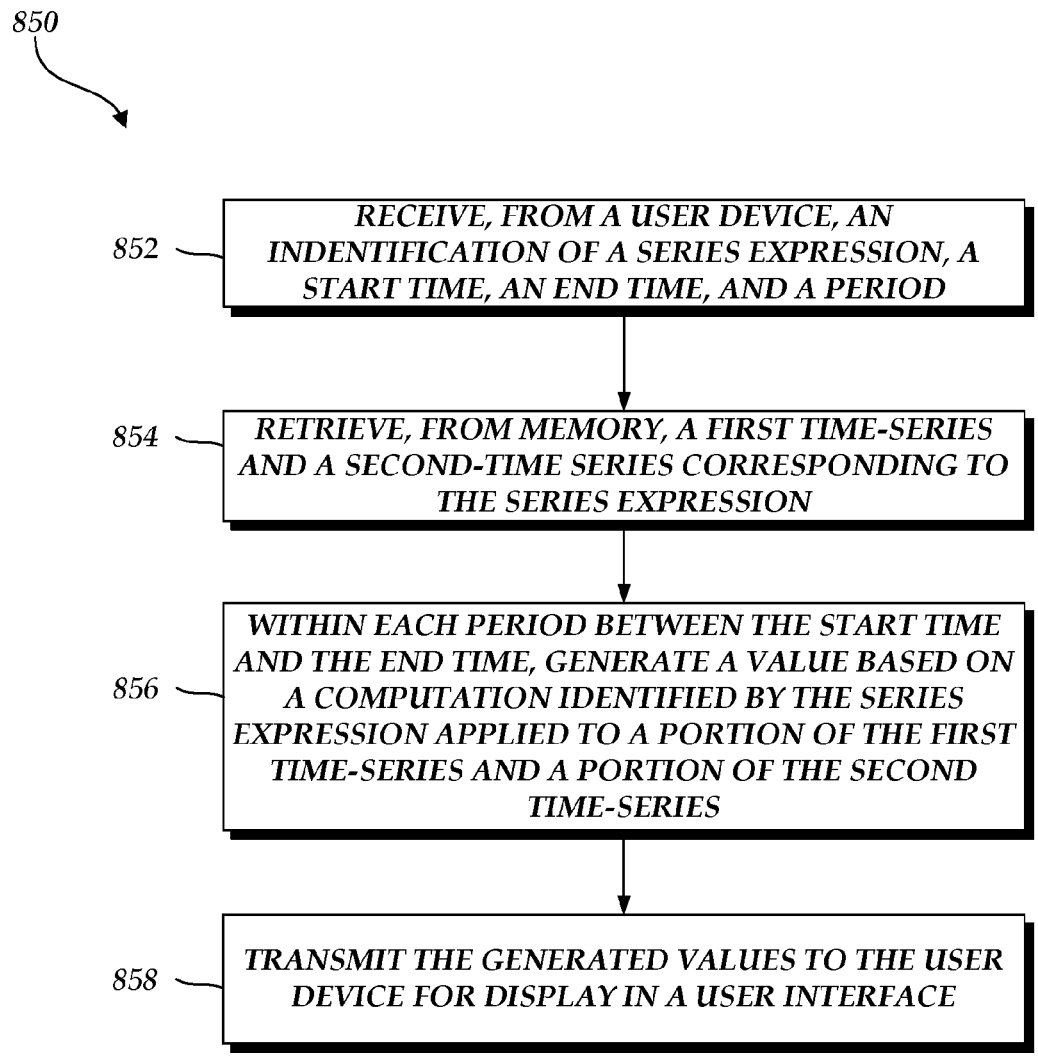
FIG. 8B is another flowchart depicting an illustrative operation of processing time-series data by a database for display in an interactive user interface.

FIG. 8B is another flowchart 850 depicting an illustrative operation of processing time-series data by a database for display in an interactive user interface. Depending on the embodiment, the method of FIG. 8B may be performed by various computing devices, such as by the time-series data store 150 described above. Depending on the embodiment, the method of FIG. 8B may include fewer and/or additional blocks and the blocks may be performed in an order different than illustrated.

In block 852, an identification of a series expression, a start time, an end time, and a period may be received from a user device. For example, the series expression may be a computational expression. The series expression may identify one or more arithmetic operations and one or more time-series data sets upon which the arithmetic operations are to be performed.

In block 854, a first time-series data file and a second time-series data file corresponding to the series expression may be retrieved from memory. The time-series data files may be a data files associated with time-series data sets identified by the series expression.

In block 856, within each period between the start time and the end time, a value based on a computation identified by the series expression applied to a portion of the first time-series data file and a portion of the second time-series data file is generated. For example, the computation may be one or more arithmetic operations. The computation may be applied to data values stored in the first time-series data file and in the second time-series data file that are associated with timestamp values that fall between the start time and the end time.

In block 858, the generated values may be transmitted to the user device for display in a user interface, such as an interactive user interface. In some embodiments, the generated values are also stored in the node data store 156.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
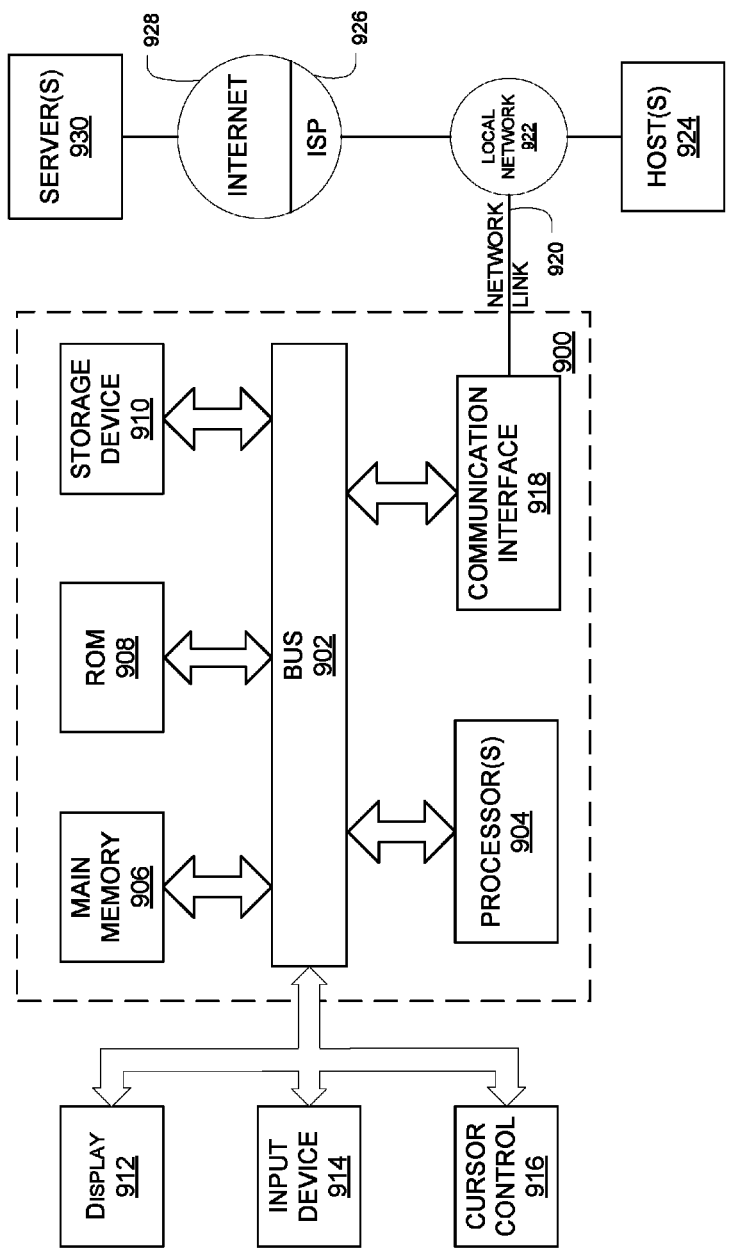
FIG. 9 illustrates a computer system with which certain methods discussed herein may be implemented, according to an embodiment.

For example, FIG. 9 is a block diagram that illustrates a computer system 900 upon which an embodiment may be implemented. For example, any of the computing devices discussed herein, such as the data source 110, the data server 140, the time-series data store 150, and/or the user device 160 may include some or all of the components and/or functionality of the computer system 900.

Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions. Main memory 906 may also store cached data, such as zoom levels and maximum and minimum sensor values at each zoom level.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions. For example, the storage device 910 may store measurement data obtained from a plurality of sensors.

Computer system 900 may be coupled via bus 902 to a display 912, such as a cathode ray tube (CRT) or LCD display (or touch screen), for displaying information to a computer user. For example, the display 912 can be used to display any of the user interfaces described herein with respect to FIGS. 3A through 3B. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 406, from which processor 904 retrieves and executes the instructions. The instructions received by main memory 906 may retrieve and execute the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

TERMINOLOGY

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A database configured to receive and process requests associated with time-series data and provide results to a user device, the database comprising:
   a processing node comprising a computer processor and memory;
   a time-series database storing a first data segment file and a second data segment file, wherein the first data segment file comprises data associated with a first time-series, wherein a size of the first data segment file is within a first size range, wherein a size of the second data segment file is within the first size range; and
   a non-transitory computer readable storage medium storing program instructions, wherein the program instructions are configured for execution by the computer processor in order to cause the processing node to:
      determine that a number of data segment files stored in the time-series database that comprise data associated with the first time-series and that have a size within the first size range is greater than a threshold value;
      compact the first data segment file with the second data segment file to form a third data segment file, wherein a size of the third data segment file is within a second size range different than the first size range;
      store the third data segment file in the time-series database;
      determine that a number of data segment files stored in the time-series database that comprise data associated with the first time-series and that have a size within the second size range is greater than a second threshold value;
      compact the third data segment file with other data segment files that comprise data associated with the first time-series and that have a size within the second size range to form a fourth data segment file, wherein a size of the fourth data segment file is within a third size range different than the first and second size ranges; and
      store the fourth data segment file in the time-series database.

2. The database of claim 1, wherein the threshold value and the second threshold value are the same value.

3. The database of claim 1, wherein the program instructions are further configured for execution by the computer processor in order to cause the processing node to mark the first data segment file and the second data segment file for deletion.

4. The database of claim 1, wherein the program instructions are further configured for execution by the computer processor in order to cause the processing node to:
receive second data associated with the first time-series;
compress the second data; and
store the compressed second data in the time-series database as the second data segment file.

5. The database of claim 4, wherein the program instructions are further configured for execution by the computer processor in order to cause the processing node to compress the second data using one of block compression, out of box compression, or a delta-based compression.

6. The database of claim 4, wherein the program instructions are further configured for execution by the computer processor in order to cause the processing node to store the compressed second data in a global write ahead log and in an in-memory buffer associated with the first time-series.

7. The database of claim 6, wherein the program instructions are further configured for execution by the computer processor in order to cause the processing node to store the compressed second data in a local write ahead log associated with the first time-series in response to the global write ahead log reaching capacity.

8. The database of claim 7, wherein the program instructions are further configured for execution by the computer processor in order to cause the processing node to store the compressed second data in the time-series database as the second data segment file in response to the local write ahead log reaching capacity.

9. The database of claim 1, wherein a range of sizes corresponding to the second size range is larger than a range of sizes corresponding to the first size range.

10. The database of claim 1, wherein the first size range is contiguous with the second size range.

11. The database of claim 1, wherein the program instructions are further configured for execution by the computer processor in order to cause the processing node to:
receive a series expression, a start time, an end time, and a period from a user device;
retrieve, from the time-series database, a portion of the third data segment file corresponding to the start time and the end time; and
transmit the portion of the third data segment file to a plug-in computation device for generating, for each period between the start time and the end time, a value based on a computation identified by the series expression.

12. The database of claim 11, wherein the program instructions are further configured for execution by the computer processor in order to cause the processing node to:
receive the generated values from the plug-in computation device; and
transmit the generated values to the user device for display.

13. The database of claim 11, wherein the start time and the end time correspond to a window of data displayed in an interactive user interface generated by the user device.

14. The database of claim 13, wherein the period identifies a period of time that corresponds with a width of a pixel in the interactive user interface.

15. The database of claim 1, wherein the first data segment file stored in the time-series database is immutable.

* * * * *